US006759766B2

(12) United States Patent
Hiratsuka et al.

(10) Patent No.: US 6,759,766 B2
(45) Date of Patent: Jul. 6, 2004

(54) POWER SUPPLY APPARATUS AND IMAGE FORMING APPARATUS USING THE SAME

(75) Inventors: Masashi Hiratsuka, Kanagawa (JP); Kunihiro Takahashi, Kanagawa (JP); Yoshinao Kondoh, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/315,153

(22) Filed: Dec. 10, 2002

(65) Prior Publication Data

US 2003/0112297 A1 Jun. 19, 2003

(30) Foreign Application Priority Data

Dec. 18, 2001 (JP) ....................................... 2001-385224

(51) Int. Cl.[7] ................................................ H02M 3/18
(52) U.S. Cl. ...................................................... 307/110
(58) Field of Search ................................ 307/109, 110, 307/154, 127; 310/308, 311; 347/58, 68; 327/536; 363/59–61, 63; 320/166, 167

(56) References Cited

U.S. PATENT DOCUMENTS 3,568,036 A * 3/1971 Rosenberg .................. 257/722
3,777,249 A * 12/1973 Dumas ................ 257/E25.024
4,298,926 A * 11/1981 Black ..................... 331/113 R

FOREIGN PATENT DOCUMENTS

| | | | | |
|---|---|---|---|---|
| JP | A 2-55577 | 2/1990 | | |
| JP | A 4-176661 | 6/1992 | | |
| JP | A 7-287620 | 10/1995 | | |
| JP | A 8-65893 | 3/1996 | | |
| JP | A 8-194551 | 7/1996 | | |
| JP | A 11-20165 | 1/1999 | | |
| JP | 2003170587 A | * | 6/2003 | ............ B41J/2/045 |
| JP | 2003200573 A | * | 7/2003 | ............ B41J/2/045 |

* cited by examiner

*Primary Examiner*—Shawn Riley
(74) *Attorney, Agent, or Firm*—Oliff & Berridge, PLC

(57) ABSTRACT

A power supply apparatus includes a boost circuit and a switch circuit. The boost circuit has rectifying elements and charge storage elements associated with the rectifying elements, and outputs a boosted voltage by sequentially cumulating charges in the charge storage elements in accordance with an AC input signal. The switch circuit switches a polarity of boosting in cumulating the charges in the charge storage elements. The boost circuit includes a circuit part that supplies charges to be sequentially cumulated in positive and negative directions in accordance with the AC input signal.

21 Claims, 19 Drawing Sheets

POWER SUPPLY APPARATUS AND IMAGE FORMING APPARATUS USING THE SAME

BACKGROUND OF THE INVENTION

1. Field of the Invention

The present invention relates to a power supply apparatus for driving a capacitive load, and more particularly, to a power supply apparatus capable of generating a high voltage without transformers. This power supply apparatus can be suitably used to supply a bias voltage of a high voltage level to a charger for charging a photoconductor member or a developing unit for developing a toner image on a photoconductor member. The present invention is also concerned with a power supply apparatus suitable for a driving unit of an inkjet recording apparatus, particularly, of a type equipped with piezoelectric elements supplied with drive signals for ejecting liquid link.

2. Description of the Related Art

Conventionally, the following is known as an electrophotographic image forming apparatus to which the power supply apparatus of the above-mentioned type is applied (hereinafter referred to as first conventional art for convenience' sake).

A conventional electrophotographic image forming apparatus is shown in FIG. 1. The surface of a photoconductor drum 100 is evenly charged at a given voltage by a primary charger 101. Then, an image is formed on the surface of the photoconductor drum 100 by exposure, so that an electrostatic latent image corresponding to the exposed image can be formed thereon. The electrostatic latent image formed on the photoconductor drum is developed by a developing unit 102, this resulting in a toner image. The toner image formed on the photoconductor drum 100 is transferred onto a transfer sheet by charging of an image transfer charger 106. The transfer sheet on which the toner image has been formed is separated from the photoconductor drum 100 by charging of a separator charger 108. Then, the image forming process ends with the step of fixing the toner image on the transfer sheet by a fixing unit (not shown).

For example, a color image forming apparatus equipped with four developing units used to sequentially form toner images of four colors on the photoconductor drum while the drum makes four turns is required to develop the toner image of color of interest without disturbing the previously developed toner image(s) of color(s). From this viewpoint, a high-voltage power supply apparatus is used which supplies, during development, one of the four developing units with a DC development bias voltage with an AC voltage necessary for enabling excellent development being superimposed thereon, while supplying the three remaining developing units with a DC voltage that prevents toner from being deposited on the photoconductor drum.

This type of high-voltage power supply apparatus is disclosed in, for example, Japanese Unexamined Patent Publication No. 8-65893, and is now illustrated in FIG. 15. The high-voltage power supply apparatus is equipped with four high-voltage power supply parts 110–113 respectively associated with four developing units 102–105. Each of the parts 110–113 has an identical configuration, and is made up of an AC voltage generator 114 that generates an AC voltage, and a DC voltage generator 115 that generates a DC voltage. The AC voltage generator 114 has a stepup transformer T for AC, having a primary winding to which an AC switching controller 116 is connected. The controller 116 turns on and off the voltage applied across the primary winding of the transformer T, so that a high AC voltage can develop across the secondary winding of the transformer T. The high voltage power supply part 111 is equipped with a voltage monitor 117 and an over current monitor 118 in order to achieve a constant-voltage output and over-current protection. The monitors 117 and 118 monitor the output voltage and the output current respectively for on/off control of the voltage applied to the primary winding of the transformer T by means of the AC switching controller 116. Thereby, the output voltage is maintained at the fixed voltage and over current is prevented from flowing in the circuit.

The DC voltage generator 115 includes a DC switching controller 119 coupled with the primary winding of another transformer T for DC. The controller 119 turns on/off a voltage applied to the transformer T, so that a high voltage can be developed across the secondary winding thereof. This high voltage is rectified by a rectifying circuit 120 composed of, for example, diodes, the resultant high DC voltage being output via a DC output controller 121.

In the above-mentioned high-voltage power supply apparatus, the AC voltage and DC voltage respectively generated by the AC voltage generator 114 and DC voltage generator 115 of each of the high-voltage power supply parts 110–113 are superimposed and the resultant bias voltages are then applied to the developing units 102–105.

However, the above-mentioned conventional high-voltage power supply apparatus has disadvantages resulting from the following. The apparatus is equipped with the four high-voltage power supply parts 110–113 respectively associated with the developing units 102–105. The developing units 102–105 are supplied with the bias voltages at the respective timings as follows. One of the developing units 102–105 subjected to development is supplied with the DC bias voltage with the AC voltage being superimposed thereon, while the three remaining developing units are supplied with only the DC voltage. Therefore, each of the high-voltage power supply parts 110–113 must be equipped with the respective transformers, namely, the AC-use transformer and DC-use transformer. Further, the apparatus is needed to have the high-voltage power supply parts 110–113 equal in number to the developing units, which act as loads. This needs a large capacity of the power supply apparatus and increases the cost.

There are proposals directed to downsizing and cost reduction of the power supply apparatus due to miniaturization and an increased number of functions of the image forming apparatus, see, for example, Japanese Unexamined Patent Publication Nos. 8-65893, 7-287620 and 8-194551.

According to Japanese Unexamined Patent Publication No. 8-65893, as shown in FIG. 16, the input lines of the primary windings of stepup transformers T1–T4 respectively associated with developing units 4*a*–4*d* serving as loads can be turned on/off independently. This arrangement makes it possible to supply a DC bias voltage with an AC voltage being superimposed thereon to the loads 4*a*–4*d* at the different timings. Further, switching means SW1–SW4 are provided on the primary sides of the transformers T1–T4, so that the switching means SQ1–SW4 can be formed by switching elements of a relatively low breakdown voltage. In FIG. 16, a reference numeral 1 indicates a photoconductor drum 1, and 11–14 indicate high-voltage power supply units. Reference numerals 15–18 indicate ac voltage generating units, and 19–22 indicate DC voltage generating units.

According to Japanese Unexamined Patent Publication No. 7-287620, as shown in FIG. 17, two switching elements 1 and 2 connected between a high-voltage DC power source 8 and ground are alternately driven, so that a high AC voltage having a rectangular waveform can be generated at a node where the elements 1 and 2 are connected in series. Further, the circuit shown in FIG. 17 allows a high DC voltage to be superimposed on the AC voltage.

Japanese Unexamined Patent Publication No. 8-194551 proposes a power supply apparatus capable of generating a DC output voltage depending on the ambient temperature. The proposed circuit does not use any transformer but employs a charge pump and a Cockcroft-Walton circuit for boosting the DC voltage. This circuit configuration enables miniaturization of the power supply apparatus.

Although the apparatus disclosed in Japanese Unexamined Patent Publication No. 8-65893 employs a smaller number of transformers, there is a limit on miniaturization because it still uses the transformers. The circuit disclosed in Japanese Unexamined Patent Publication No. 7-287620 needs the high-voltage DC source subjected to switching, and does not satisfactorily reduce the size. Further, the switching elements that switch over between the high voltage and ground are needed to have a relatively high breakdown voltage. The circuit proposed in Japanese Unexamined Patent Publication No. 8-194551 does not need any transformer, which facilitates downsizing. However, the circuit intends to realize the DC power supply, and is not used to generate the DC voltage with the AC voltage being superimposed thereon. Further, this publication does not concretely describe the Cockcroft-Walton circuit.

Japanese Unexamined Patent Publication No. 2-55577 discloses a power supply circuit using the Cockcroft-Walton circuit. This power supply circuit does not employ any general transformer in the Cockcroft-Walton circuit. This enables further downsizing of the power supply apparatus. However, the apparatus is able to generate only a positive DC voltage with respect to the ground potential, and is not able to generate both positive and negative DC voltages of the opposite polarities. Further, the apparatus is directed to generating the pure DC voltage and is not applied to generation of a DC voltage with an AC voltage being superimposed thereon.

A description will now be given of another conventional power supply apparatus (hereinafter referred to as second conventional art for convenience' sake) suitable for driving the inkjet recording apparatus. An image recording mechanism of the inkjet recording apparatus employs a piezoelectric element, which is supplied with a drive signal. The volume of an ink chamber full of ink is varied due to deformation of the piezoelectric element, so that ink can be ejected. The drive signal that drives the piezoelectric element has a lower voltage than the voltages used for charging and developing in the image forming apparatus of the electrophotographic type, but has a higher voltage than the voltages for driving regular electronic circuits of home electric appliances. Generally, the drive signal applied to the piezoelectric element has a rectangular waveform. However, in recent years, the drive signal has been designed to have particular waveforms rather than the rectangular waveform in order to control the size and shape of ink drops and improve the rate of iterant ejection. For instance, the drive signal may have slant rising and falling edges or may have consecutive vibrations that form one ink drop. Japanese Unexamined Patent Publication No. 11-20165 discloses a circuit capable of generating the drive signal of the above type. The circuit has a voltage/current amplifier that amplifies a low-voltage pulse signal produced from a D/A converter.

However, the voltage/current amplifier disclosed in Japanese Unexamined Patent Publication No. 11-20165 needs an expensive high voltage power source and is not good in practice. There is also another disadvantage in that the piezoelectric element is constantly supplied with high energy because it is driven to always conduct.

Japanese Unexamined Patent Publication No. 4-176661 discloses a technique of generating a high-voltage pulse from a low-voltage power source. This technique proposes a circuit including a series resonance circuit including an inductance element and a flyback voltage hold circuit equipped with a rectifying element interposed between the inductance element and the piezoelectric element. As is shown in FIG. 18 that illustrates a functional block of the above circuit, a drive circuit 200 includes a switch 220 connected to a low-voltage power source 210. An inductance element 230, a rectifying circuit 240 and a selector circuit 260 are connected in series between the switch circuit 220 and a piezoelectric element TD. When the switch circuit 220 is turned on, a low voltage generated by the low-voltage power source 210 is applied to the selector circuit 260 via the switch circuit 220, the inductance element 230 and the rectifying circuit 240. The selector circuit 260 is turned on responsive to a select control signal, and the low voltage from the low-voltage power source 210 is applied to the piezoelectric element TD. A discharge circuit 250 is connected to the output terminal of the rectifying circuit 240. A switch circuit 270 is connected to the node between the inductance 230 and the rectifying circuit 240.

When an image is formed on the recording medium, the switch circuit 220 is turned on in response to a control signal, so that a supply of the low voltage from the source 210 to the inductance element 230 can be initiated. The switch 230 receives a charge control signal and starts charge control. The discharge circuit 250 receives a discharge control signal and starts discharge control. Energy applied to the piezoelectric element TD is regulated by the charge and discharge controls. Thus, the charge voltage applied to the piezoelectric element TD is retained during a predetermined period while energy applied to the piezoelectric element TD is regulated.

However, the above technique requires the inductance element 230 to have an extremely small inductance value when the piezoelectric element TD has a large capacitive value. Therefore, the circuit 200 can drive only restricted piezoelectric elements.

In short, although the first conventional art enables downsizing of the power supply apparatus because of the absence of the transformer, it cannot generate the DC voltage with the AC voltage being superimposed thereon. Particularly, the circuit with the Cockcroft-Walton circuit that does not need any transformer cannot generate the DC voltage having two polarities and that with the AC voltage being superimposed thereon. The second conventional art has a limit on usable components dependent on the capacitive value of the load to be driven, and is therefore applicable to only limited driving.

SUMMARY OF THE INVENTION

The present invention has been made in view of the above circumstances and provides a power supply apparatus and an image forming apparatus using the same.

More specifically, the present invention provides a compact, lightweight power supply apparatus suitable for various applications and an image forming apparatus using the same.

According to an aspect of the present invention, a power supply apparatus has: a boost circuit that has rectifying elements and charge storage elements associated with the rectifying elements and outputs a boosted voltage by sequentially cumulating charges in the charge storage elements in accordance with an AC input signal; and a switch circuit that switches a polarity of boosting in cumulating the charges in the charge storage elements, the boost circuit including a circuit part that supplies charges to be sequentially cumulated in positive and negative directions in accordance with the AC input signal.

According to another aspect of the present invention, a power supply apparatus has: a boost circuit having unit circuits connected in a ladder formation, each of the unit circuits including two rectifying elements and one charge storage element; and a switch circuit interchanging connections of an AC input signal and a load to input and output terminals of the boost circuit, the boost circuit including a first charge storage circuit connected between ground and one of the unit circuits located at a first stage in a positive direction and a second charge storage circuit connected between the ground and another one of the unit circuits located at a first stage in a negative direction.

According to another aspect of the invention, a power supply apparatus has: a boost circuit having 2n rectifying elements connected forwardly from a first terminal to a second terminal ($1 \leqq n$), each of the 2n rectifying elements having first and second ends, and having charge storage elements provided so as to connect the first end of the (2i+1)th rectifying element and the second end of the (2i+2)th rectifying element ($0 \leqq i \leqq n-1$) and to connect the second end of the (2i+1)th rectifying element and the second end of the (2i+3)th rectifying element ($0 \leqq i \leqq n-2$), the second ends of the first and (2n−1)th rectifying elements being grounded via respective charge storage elements; and a switch circuit that interchanges connections of an AC input signal and a load to the first and second terminals of the boost circuit.

According to another aspect of the invention, a power supply apparatus has: a positive-side boost circuit including first rectifying elements, first charge storage elements, and a first circuit part that supplies charges to be sequentially cumulated in the first charge storage elements in accordance with an AC signal; a negative-side boost circuit including second rectifying elements, second charge storage elements, and a second circuit part that supplies charges to be sequentially cumulated in the second charge storage elements in accordance with the AC signal; and a switch circuit that selectively supplies a load with one of outputs of the positive-side and negative-side boost circuits in accordance with a given sequence.

According to another aspect of the invention, a power supply apparatus has: a positive-side boost circuit having 2n rectifying elements connected forwardly from a first terminal to a second terminal ($1 \leqq n$), each of the 2n rectifying elements having first and second ends, and having charge storage elements provided so as to connect the first end of the (2i+1)th rectifying element and the second end of the (2i+2)th rectifying element ($0 \leqq i \leqq n-1$) and to connect the second end of the (2i+1)th rectifying element and the second end of the (2i+3)th rectifying element ($0 \leqq i \leqq n-2$), the second end of a first rectifying element in a positive direction being grounded via a first charge storage circuit; a negative-side boost circuit having 2n rectifying elements connected reversely from the first terminal to the second terminal ($1 \leqq n$), each of the 2n rectifying elements of the negative-side boost circuit having third and fourth ends, and having charge storage elements provided so as to connect the third end of the (2i+1)th rectifying element and the fourth end of the (2i+2)th rectifying element ($0 \leqq i \leqq n-1$) and to connect the fourth end of the (2i+1)th rectifying element and the fourth end of the (2i+3)th rectifying element ($0 \leqq i \leqq n-2$), the fourth end of a first rectifying element in a negative direction being grounded via a second charge storage circuit; and a switch circuit that selectively supplies outputs of the positive-side and negative-side boost circuits to a load.

According to another aspect of the invention, an image forming apparatus has: an image forming part; and a power supply apparatus supplying drive power to the image forming part. The power supply may be configured by any of the above-mentioned power supply apparatus.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

A description will now be given of embodiments of the present invention with reference to the accompanying drawings.

(First Embodiment)

Figure 1:
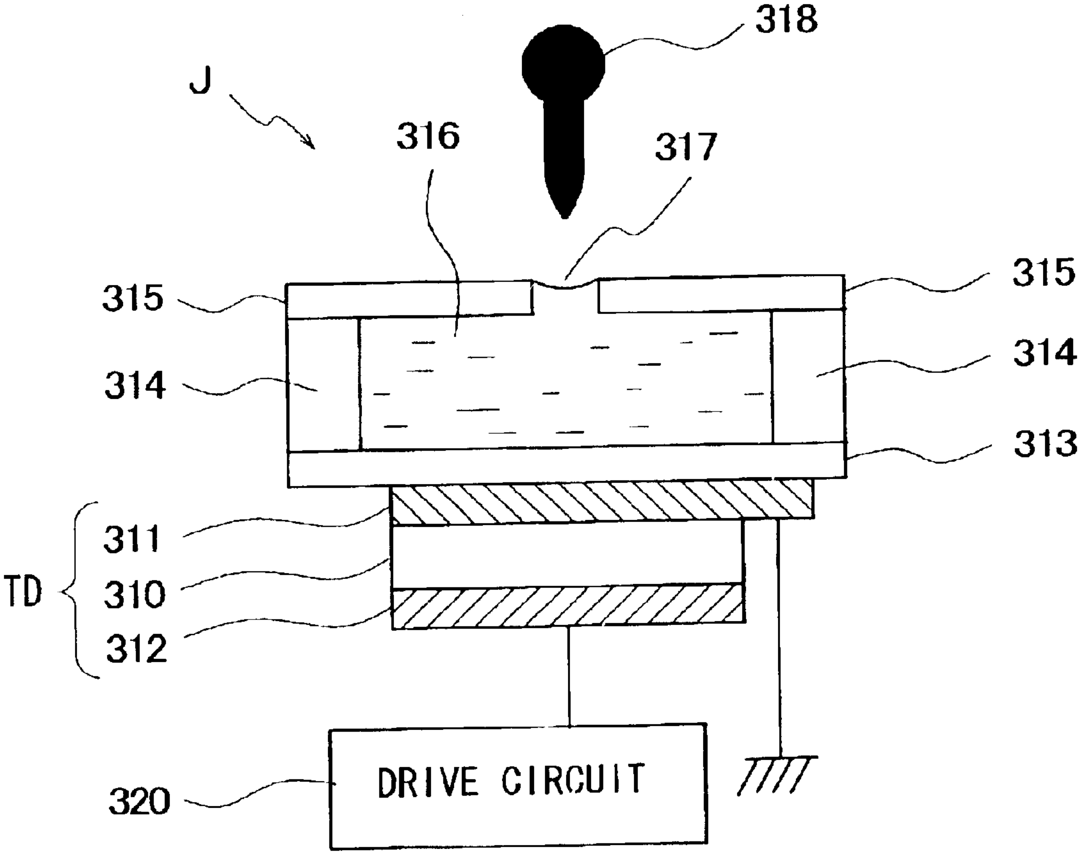
FIG. 1 is a schematic cross-sectional view of an ejector that ejects an ink drop by driving a piezoelectric element supplied with electricity generated by a power supply apparatus acting as a drive circuit according to a first embodiment of the present invention.

FIG. 1 is a cross-sectional view of an outline of an ejector J that ejects an ink drop by driving a piezoelectric element involved in a first embodiment of the present invention. The ejector J is made up of an ink chamber 316 and a piezoelectric element TD. The ink chamber 316 has a vibrator plate 313 and a top plate 315 having an ink ejection outlet 317. The plates 313 and 315 are spaced apart from each other at a predetermined distance defined by a sidewall 314. This sidewall 314 is fixed to opposing surfaces of the plates 313 and 315 so as to define the ink chamber 316. The ink chamber 316 is filled with liquid ink and retains the ink therein. The piezoelectric element TD is made up of a first electrode 311, a second electrode 312 and a piezoelectric member 310 sandwiched between the electrodes 311 and 312.

The first electrode 311 is grounded, and the second electrode 312 is connected to a power supply apparatus acting as a drive circuit 320 for driving the ejector 312. As will be described in detail later, the drive circuit 320 generates a high-voltage pulse signal, which is applied to the piezoelectric element TD. The drive circuit 320 acts as a power supply circuit capable of the high-voltage pulse signal. The high-voltage pulse signal applied by the drive circuit 320 deforms the piezoelectric member 310. Then, the vibrator plate 313 is deformed due to the deformation of the piezoelectric member 310. The deformation of the vibrator plate 313 applies pressure to the ink chamber 316, so that the ink drop 318 is ejected from the ink ejection outlet 317.

A print head is equipped with a plurality of ejectors each having the same structure as shown in FIG. 1.

Figure 2:
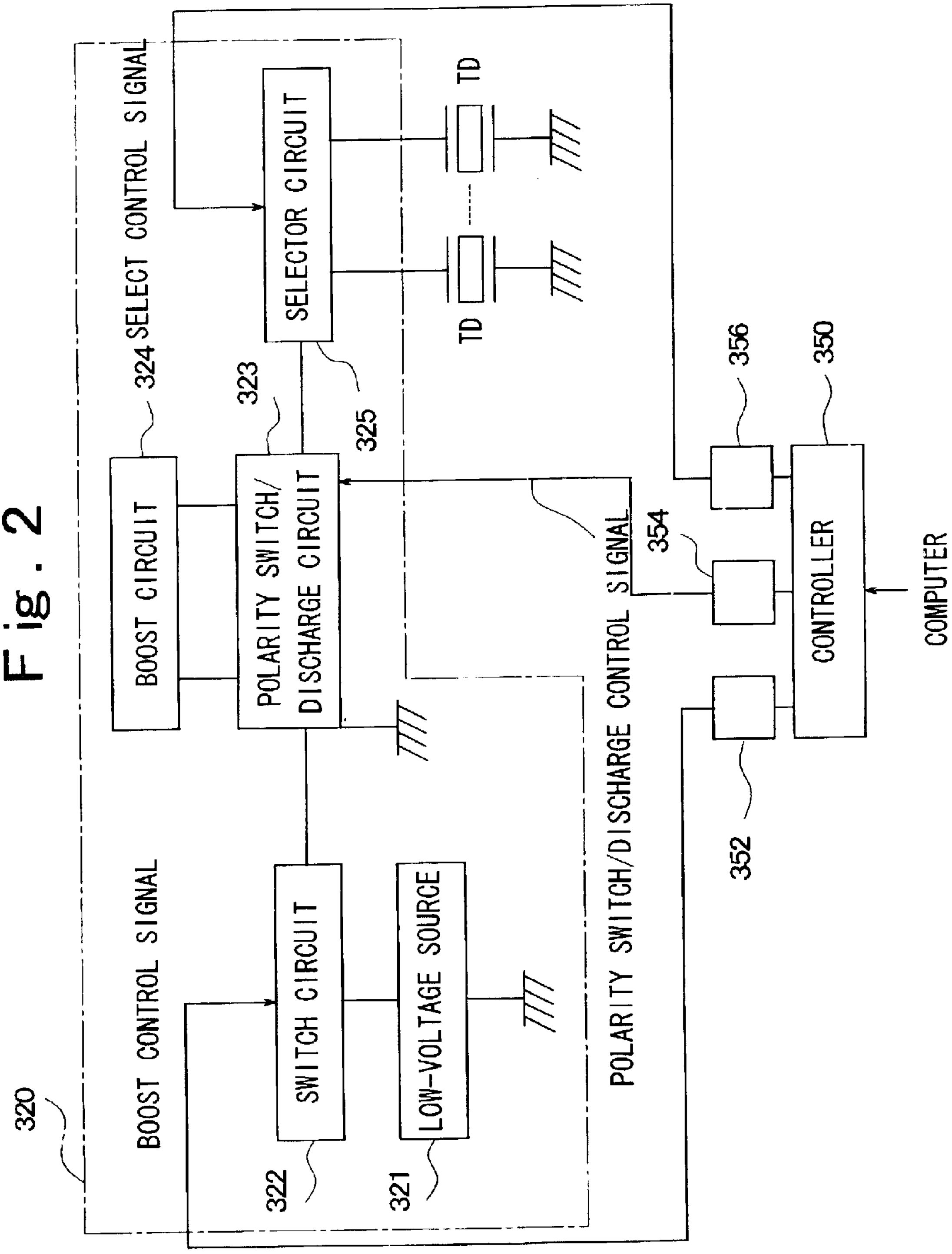
FIG. 2 is a block diagram of the drive circuit according to the first embodiment of the present invention.

FIG. 2 schematically illustrates the structure of the drive circuit 320, which is made up of a low-voltage power source 321, a switch circuit 322, a polarity switch/discharge circuit 323, a boost circuit 324, and a selector circuit 325. The switch circuit 322 is supplied with a boost control signal for generating a waveform with which the piezoelectric elements TD are selectively driven (this will be described in detail) The switch circuit 322 is connected to one end of the low-voltage power source 321, the other end of which is grounded. The switch circuit 322 is coupled with the selector circuit 325 via the polarity switch/discharge circuit 323 and the boost circuit 324 connected thereto. The piezoelectric elements ID (ejectors J) are connected to the control side of the selector circuit 325. The selector circuit 325 is supplied with a select control signal used to select one or more piezoelectric elements to be driven. The polarity switch/discharge circuit 323 is supplied with a polarity switch/discharge control signal, which switches the polarity of the drive waveform and instructs discharging in the switching process.

The switch circuit 322 turns on/off the low-voltage power source 321 in response to the boost control signal. The low-voltage pulse signal from the switch circuit 322 is applied to the polarity switch/discharge circuit 323. When the polarity switch/discharge control signal indicates "positive", the circuit 323 connects the input of the boost circuit 324 to the switch circuit 322, and connects the output thereof to the selector circuit 325.

The boost circuit 324 differs from the general Cockcroft-Walton circuit and does not employ any transformer unlike the general circuit. The boost circuit 324 has two opposite polarities. When the boost circuit 324 is used in the positive direction, it boosts the input in the positive direction. In contrast, when the boost circuit 324 is used in the negative direction, it boosts the input in the negative direction. The details of the boost circuit 324 will be described later.

The boost circuit 324 connected to the switch circuit 322 in the positive direction by the polarity switch/discharge circuit 323 holds the boosted voltage. The selector circuit 325, which is interposed between the boost circuit 324 and the piezoelectric element TD and is connected in series to the piezoelectric elements TD, turns on/off each of the piezoelectric elements TD in accordance with the select control signal applied thereto. Then, the selector circuit 325 allows the boosted voltage held by the boost circuit 324 to be applied to the selected piezoelectric elements TD. When the polarity of the boost circuit 324 is switched in response to the polarity switch/discharge control signal, the boost circuit 324 is discharged, and is connected in the opposite direction. Thus, the boost circuit 324 is ready for boosting in the negative direction.

The drive circuit 320 is supplied with the various signals mentioned above. The drive circuit 320 is connected to a controller 350, which controls the piezoelectric elements TD or ejectors J in accordance with image data transferred from an information processing apparatus such as a computer, which is not shown in FIG. 2 for the sake of simplicity. The controller 350 is connected to the switch circuit 322 via a boost control signal generator 352, to the polarity switch/discharge circuit 323 via a polarity switch/discharge control signal generator 354, and to the selector circuit 325 via a select signal generator 356. The generators 352, 354 and 356 may be formed by amplifiers that match the control signals from the controller 350 with the associated circuits. If the controller 350 is capable of directly driving the switch circuits 322, 323 and 325, the generators 352, 354 and 356 may be omitted.

Upon receiving image data, the controller 350 generates drive data that can be output through the ejectors J, and produces the boost control signal, polarity switch/discharge control signal and select signal based on the drive data. These control signals control the drive circuit 320, which selects the associated piezoelectric elements TD, so that a desired image can be formed on the recording medium.

An inkjet printer can be formed by a print head including the ejectors, the drive circuits 320 for driving the print head and the controller 350 for controlling the drive circuit 320 on the basis of the image data to be recorded.

Figure 3:
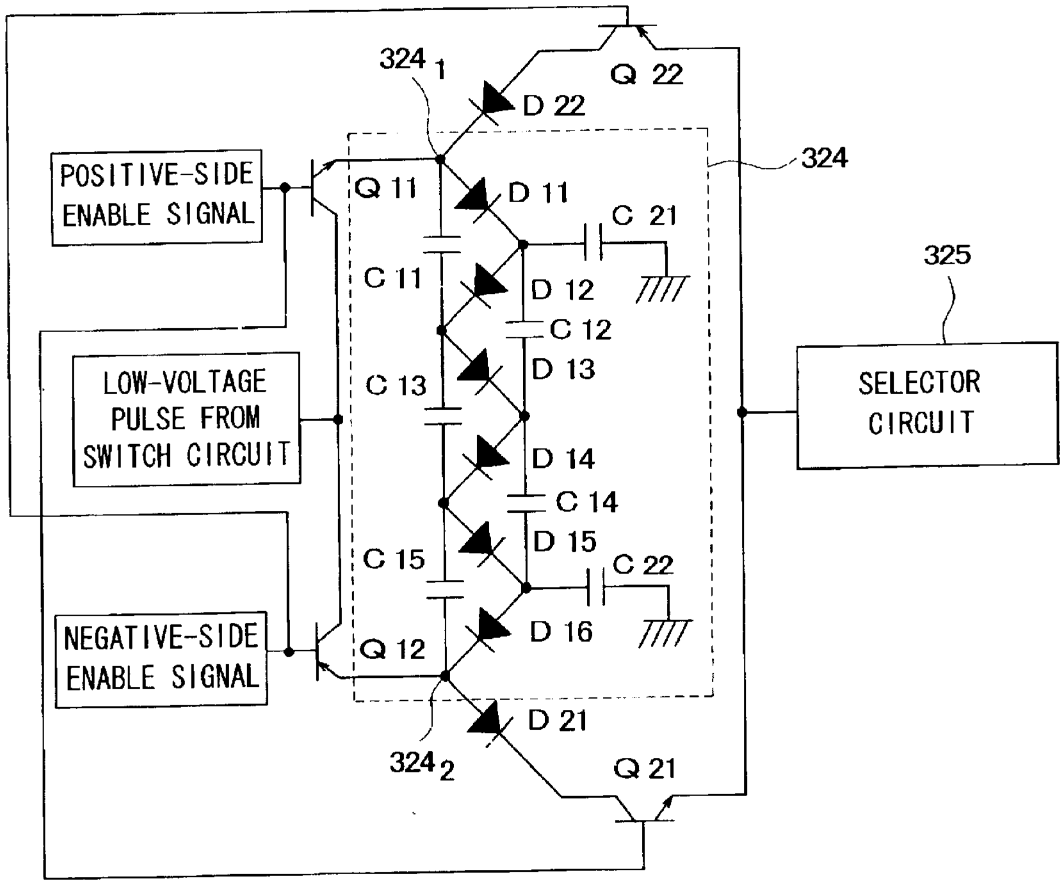
FIG. 3 is a circuit diagram of a boost circuit and a polarity switch/discharge circuit shown in FIG. 2.

FIG. 3 shows a circuit configuration of the boost circuit 324 and the polarity switch/discharge circuit 323. Referring to FIG. 3, the boost circuit 324 is made up of a ladder circuit having five stages and two capacitors. The five-stage ladder circuit includes six diodes D11–D16 and five capacitors C11 and C15. The six diodes D11–D16 are forwardly connected in the same direction. Each of the capacitors C11–C15, which act as charge storage elements, is arranged so as to connect the cathode and anode of the adjacent diodes. The capacitors C11 and C12 hold first input charges in the positive and negative directions. Nodes $\mathbf{324}_1$ and $\mathbf{324}_2$ are ends of the boost circuit 324 and serve as the input and output terminals thereof or the output and input terminals, respectively. The ladder circuit is a so-called voltage multiplying circuit and enables six-times boosting in this example. More specifically, two diodes (for example, D11 and D12) and one capacitor (for example C11) form a unit circuit of the voltage multiplying circuit in the ladder circuit. Multiple unit circuits are arranged in the ladder formation. The capacitor C21, which is a charge storage element, is provided between the unit circuit located at the first stage in the positive direction and the ground. Similarly, the capacitor C22 is provided between the unit circuit located at the first stage in the negative direction and the ground. The boost circuit 324 may be defined as follows. That is, 2n rectifying elements are forwardly connected in series ($1 \leqq n$: n is an integer) from a first terminal to a second terminal. Charge storage elements are provided so as to connect the first end of the (2i+1)th rectifying element and the second end of the (2i+2)th rectifying element ($0 \leqq i \leqq n-1$) and to connect the second end of the (2i+1)th rectifying element and the second end of the (2i+3)th rectifying element ($0 \leqq i \leqq n-2$) The second ends of the first and (2n−1)th rectifying elements are grounded via the respective capacitors.

The polarity switch/discharge circuit 323 is made up of two npn transistors Q11 and Q21, and two pnp transistors Q12 and Q22. The transistors Q11 and Q21 act as switches controlled by a positive-side enable signal. The transistors Q12 and Q22 act as switches controlled by a negative-side enable signal. The transistors Q11 and Q21 form a first switch circuit of the polarity switch/discharge circuit 323, and the transistors Q12 and Q22 form a second switch circuit thereof. The switch circuit 322 shown in FIG. 3 generates the low-voltage pulse signal on the basis of the boost control signal from the controller 350. Similarly, the polarity switch/discharge control signal 323 generates the positive-side enable signal that turns on the transistors Q11 and Q21 and the negative-side enable signal that turns off the transistors Q12 and Q22 on the basis of the polarity switch/discharge control signal from the controller 350. In this state, the low-voltage pulse (AC input signal) from the switch circuit 322 (FIG. 2) is applied to the boost circuit 324 via the transistor Q11. The boosted output passes through the transistor Q21 and is then stored, via the selector circuit 325, in the associated piezoelectric element TD, which is the capacitive load. Each time the low-voltage pulse signal from the switch circuit 322 is applied to the boost circuit 324, a voltage of 6 Vm boosted by the boost circuit 324 is stored in the piezoelectric element TD where Vm denotes the voltage of the low-voltage pulse from the switch circuit 322. The diode D21 connected to the transistor S21 acts as a sample and hold circuit in the positive direction, and holds the boosted voltage. Similarly, the sample and hold circuit in the negative direction is provided by the diode D22. When the low-voltage pulse from the switch circuit 322 is stopped in response to the boost control signal, the charge stored in the piezoelectric element is retained. It can be seen from the above that the transistors Q11, Q12, Q21 and Q22 form a switch circuit that interchanges connections of the low-voltage pulse and the piezoelectric element to the first and second terminals $324_1$ and $34_2$ of the boost circuit 324.

The transistors Q11 and Q21 may be replaced by n-channel field effect transistors, and the transistors Q12 and Q22 may be replaced by p-channel field effect transistors. Preferably, these field effect transistors are of a type that does not have a parasitic capacitance between the source and drain. If the polarities of the positive-side and negative-side enable signals are reversed, transistors of reverse conduction types can be used.

Figure 19:
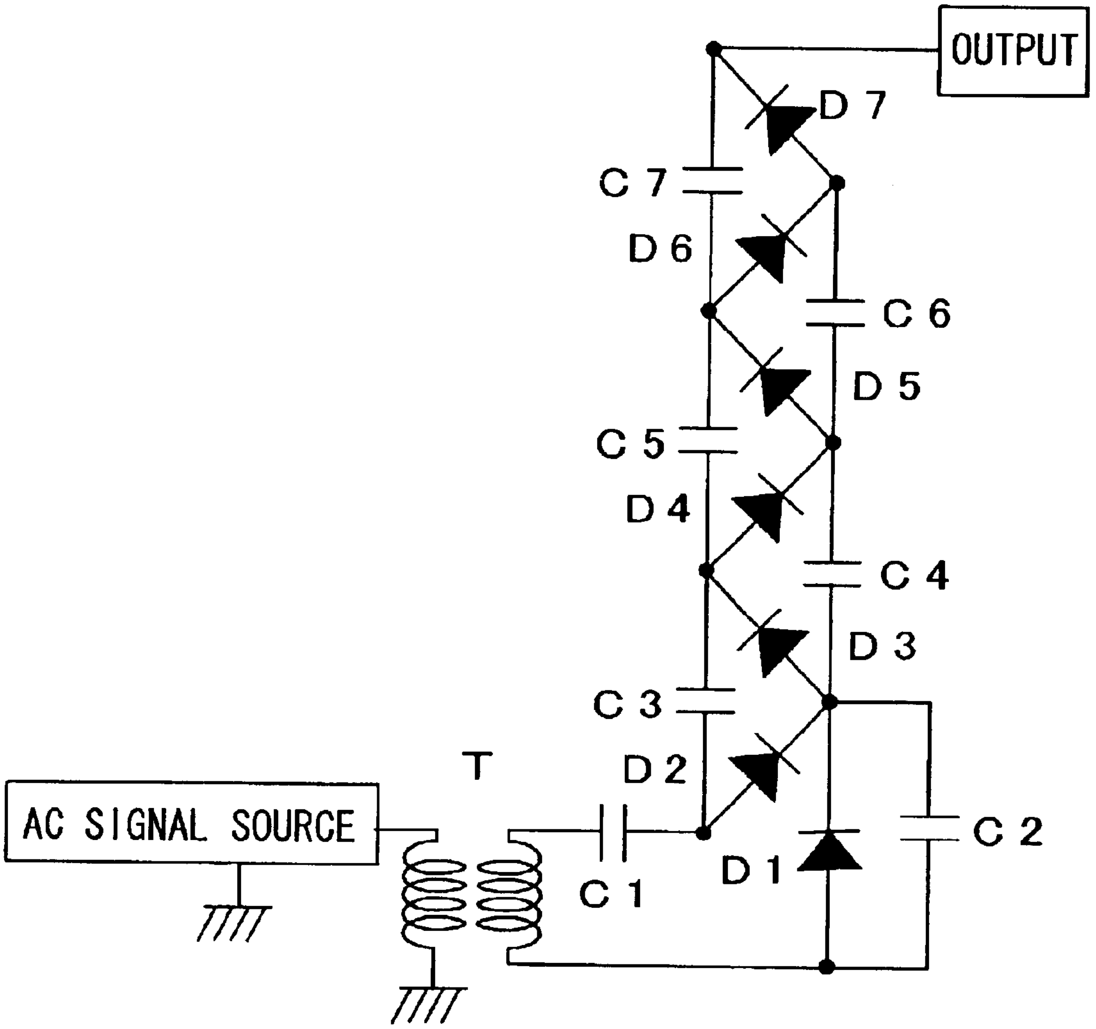
FIG. 19 is a circuit diagram of an example of the Cockcroft-Walton circuit.

Here, a description will be given of the difference between the above-mentioned boost circuit 324 and the conventional Cockcroft-Walton circuit with the transformer. FIG. 19 is a circuit diagram of the conventional Cockcroft-Walton circuit. This circuit is made up of a transformer T, diodes D1–D7 and capacitors C1–C7. An AC signal generated by an AC signal source connected across the primary winding of the transformer T is induced to the secondary winding, and charges the capacitors C1 and C2 via the diode D1. Next, the charges stored in the capacitors C1 and C2 shift to the capacitor C3 via the diodes D2 and D3. The charge stored in the capacitor C3 shifts to the capacitor C4 via the diode D4. In the above manner, the charge is cumulated by the principle of the voltage-doubler rectifier, and the six-times DC voltage is finally generated.

In contrast, the boost circuit 324 shown in FIG. 3 does not need the transformer T shown in FIG. 19. Instead of the transformer T, the capacitors C21 and C22 are employed. The charges necessary for boosting are stored in the capacitors C21 and C22, which enable omission of the transformer T. The capacitor C21 holds the first input charge via the diode D11 when cumulating the charge in the positive direction. The charge stored in the capacitor C21 shifts to the capacitor C11 via the diode D12. The charge cumulating operation commences with a supply of the charge stored in the capacitor C21 by applying the low-voltage pulse thereto. The capacitor C21 acts as a circuit for supplying the charge for boosting the low-voltage pulse (AC input signal) in the positive direction. The capacitor C21 is functionally substituted for the transformer T. Similarly, the capacitor C22 holds the first input charge from the ground when cumulating the charge in the negative direction. The charge in the capacitor C22 shifts to the capacitor C15 via the diode D15. The polarity of boosting in the negative direction by cumulating the charges in the capacitors C11–C15 is opposite to that of boosting in the positive direction. In other words, the polarity of boosting is reversed by operatively reversing the rectifying diodes D11–D16. In the charge cumulating operation, the capacitor C22 supplies the charge resulting from the low-voltage pulse. That is, the capacitor C22 acts as a circuit for supplying the charge for boosting the low-voltage pulse (AC input signal) in the negative direction. Thus, the capacitor C21 is functionally substituted for the transformer T. As a result of the above cumulating operation, the boost circuit 324 boosts the input voltage by six times in the positive and negative directions.

The operation of the drive circuit 320 according to the first embodiment of the present invention is described. For the sake of simplicity, the selector circuit 325 will be omitted and a case will be described where only one piezoelectric element TD is driven.

Figures 4A, 4B, 4C, 4D:
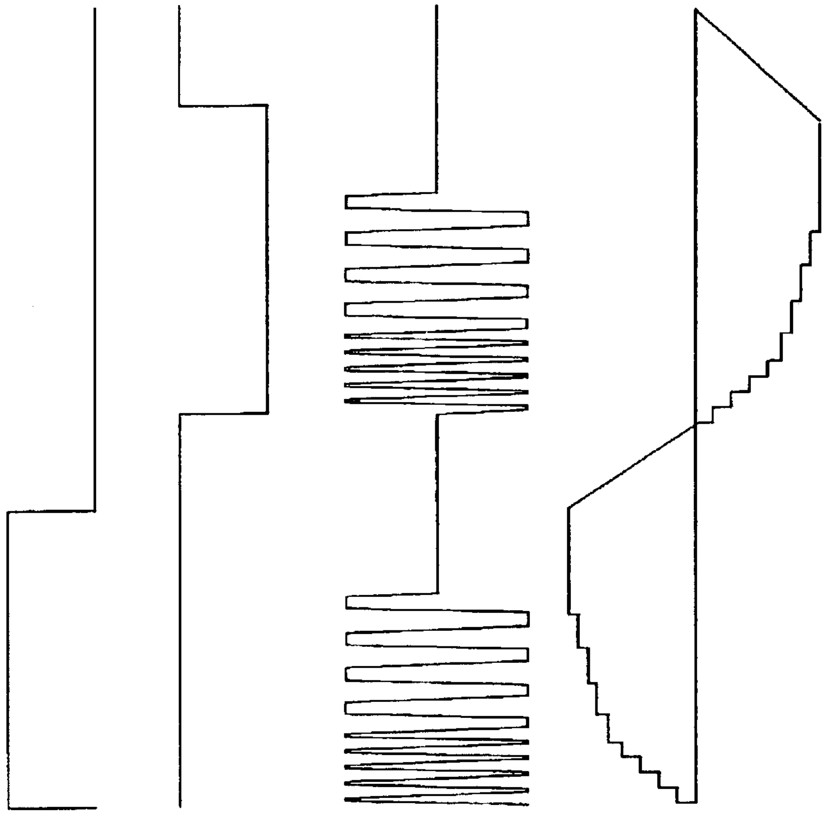
FIGS. 4A through 4D are timing charts illustrating operations of the boost circuit and the polarity switch/discharge circuit shown in FIG. 3.

FIGS. 4A through 4D are timing charts of an operation of the drive circuit 320. FIGS. 4A and 4B respectively illustrate the positive-side and negative-side enable signals, which are derived from the polarity switch/discharge control signal. When the positive-side enable signal is on, the transistors Q1 and Q21 acting as switches conduct, so that the boost circuit 324 is connected in the direction in which the charge is cumulated in the positive direction.

FIG. 4C shows the low-voltage pulse based on the boost control signal. The low-voltage pulse is produced by processing a pulse signal of 5 V generated by the boost control signal generator 352 by a push-pull amplifier circuit in such a way as to have the same positive and negative amplitudes. In operation, the low-voltage pulse may be replaced by a high-voltage pulse or a sine wave.

The positive component of the low-voltage pulse shown in FIG. 4C is applied to the boost circuit 324, which boosts the pulse stepwisely as shown in FIG. 4D, which shows the potential of the piezoelectric element TD. The saturated value of the boosted voltage and the time constant depend on the number of stages of the boost circuit 324. The time constant in stepwise-increase charging at each stage depends on the resistance of the diodes and capacitors that form the boost circuit 324. It is therefore possible to control the shape of the stepwise boosted waveform by controlling the number of stages of the ladder circuit, the capacitances of the capacitors thereof, and the frequency and voltage of the low-voltage pulse. Here, by changing the frequency of the pulse, the slope of the potential profile is changed. Since the pulse having a duty ratio of 50%, the capacitance values of the capacitors are adjusted within the range in which the amount of charge cumulated is constant regardless of the pulse width. Even if the amount of charge cumulated changes, the slope of the potential profile can be controlled by the frequency of the pulse and/or the time when the pulse is being applied.

After the low-voltage pulse derived from the boost control signal becomes 0 V, the potential of the piezoelectric element TD is retained at a still high level. When the positive-side enable signal is turned off, discharging the piezoelectric element TD is initiated. The time constant at that time depends on the capacitance value of the piezoelectric element TD, the wiring resistance and the ON resistance of the transistor Q11.

In order to quickly reduce the potential of the piezoelectric element TD to 0 V, a transistor that switches between the ground and the floating state may be provided between the boost circuit 324 and the load. By applying a control signal to the transistor, the output voltage can quickly be settled at 0 V.

When the negative-side enable signal shown in FIG. 4B is on, the transistors Q12 and Q22 acting as switches conduct, so that the boost circuit 324 is connected in the direction in which the charge is cumulated in the negative direction. As in the case of the operation in the positive direction, the charges are cumulated and then discharging takes place. This results in a desired drive waveform. By changing the frequency and applied time of the boost control signal and the timing of the polarity switch/discharge control signal, the desired shape can be generated from the power source lower than the voltage of the output waveform.

According to the present embodiment, it is possible to easily generate the drive signal that has a voltage of ±40 V and an iterative frequency of 20 kHz. The push-pull circuit used to generate the low-voltage pulse shown in FIG. 4C is driven by a power source of ±10 V. The enable signals shown in FIGS. 4A and 4B are generated by using a power source of ±45 V. The voltages of ±44 V can be generated by a circuit shown in FIG. 14, which can generate high-voltage, high-frequency drive signals used for the piezoelectric elements from a low-voltage source. The circuit shown in FIG. 14 corresponds to a variation obtained by separating the boost circuit 324 into the positive-side circuit and the negative-side circuit. The operation of the positive-side circuit is now described. A boost control signal A generated from the low-voltage source is a sine wave or pulse, and is boosted by six times by the circuit made up of the diodes and capacitors as has been described with reference to FIG. 3. The cumulated voltage is stored in the capacitor C231 connected between a +45 V output terminal and the ground. A Zener diode ZD201 of a reverse voltage of 45 V is provided so that the cathode thereof is connected to the +45 V output terminal and the anode is grounded. The Zener diode ZD 201 limits the positive-side boosted output at +45 V. Thus, the output can be maintained at +45 V while the boost control signal A is constantly applied. Of course, boosting is allowed at appropriate timings. The negative-side boost circuit operates in the same manner as described above.

The drive circuit acting as the power supply apparatus according to the first embodiment of the present invention may be applied to not only the piezoelectric elements but also the charger and developing unit of the electrophotographic image forming apparatus. According to the present embodiment, the compact, lightweight, high-speed power supply apparatus can be provided. Further, it is possible to generate the boost voltages of the opposite polarities by means of the single boost circuit 324 and the switch mechanism that changes the polarity of boosting or cumulating the charges in the capacitors.

(Second Embodiment)

Figure 15:
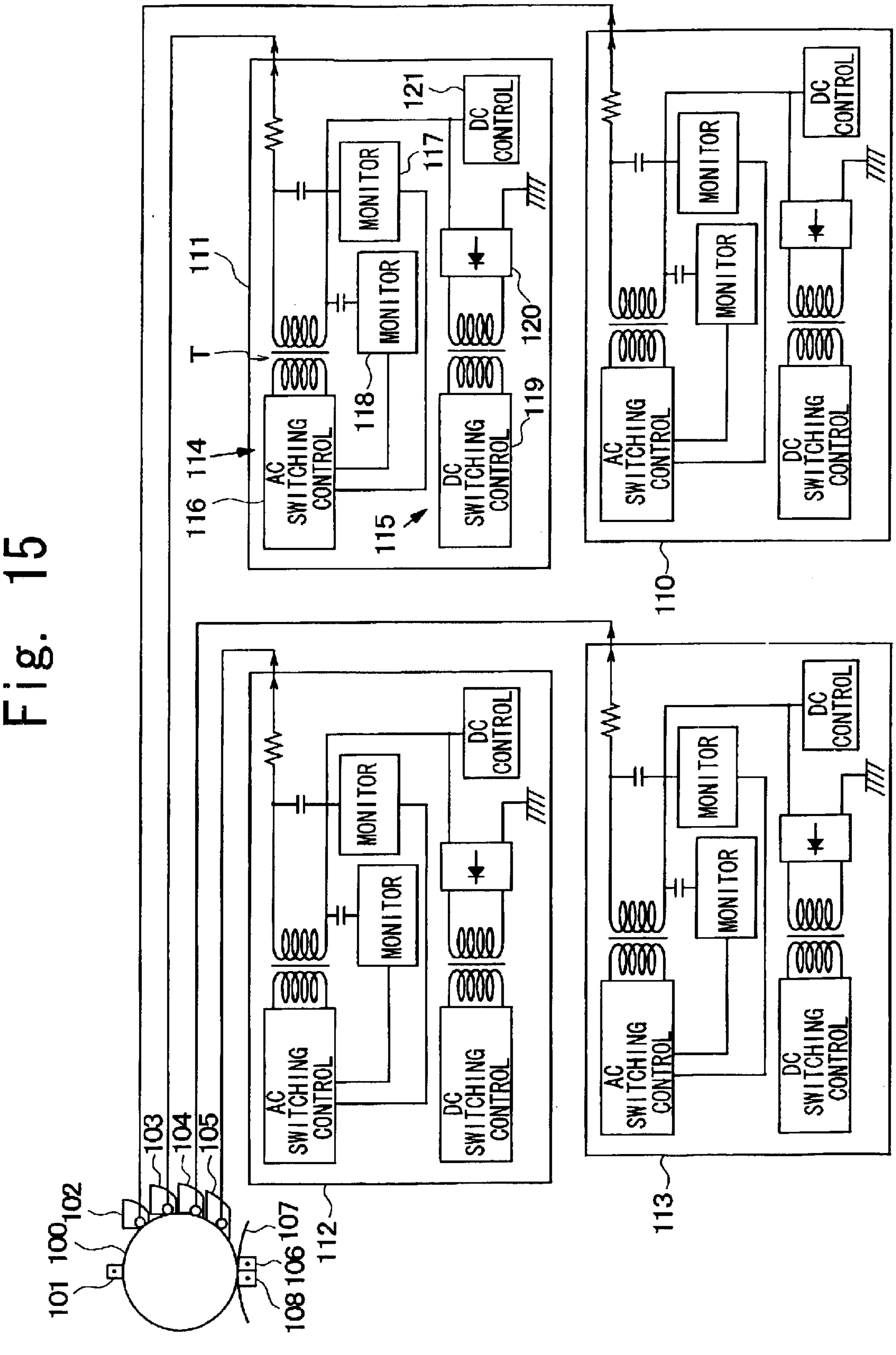
FIG. 15 is a block diagram of a conventional power supply apparatus that drives a developing unit of an electrophotographic image forming apparatus.
Figure 16:
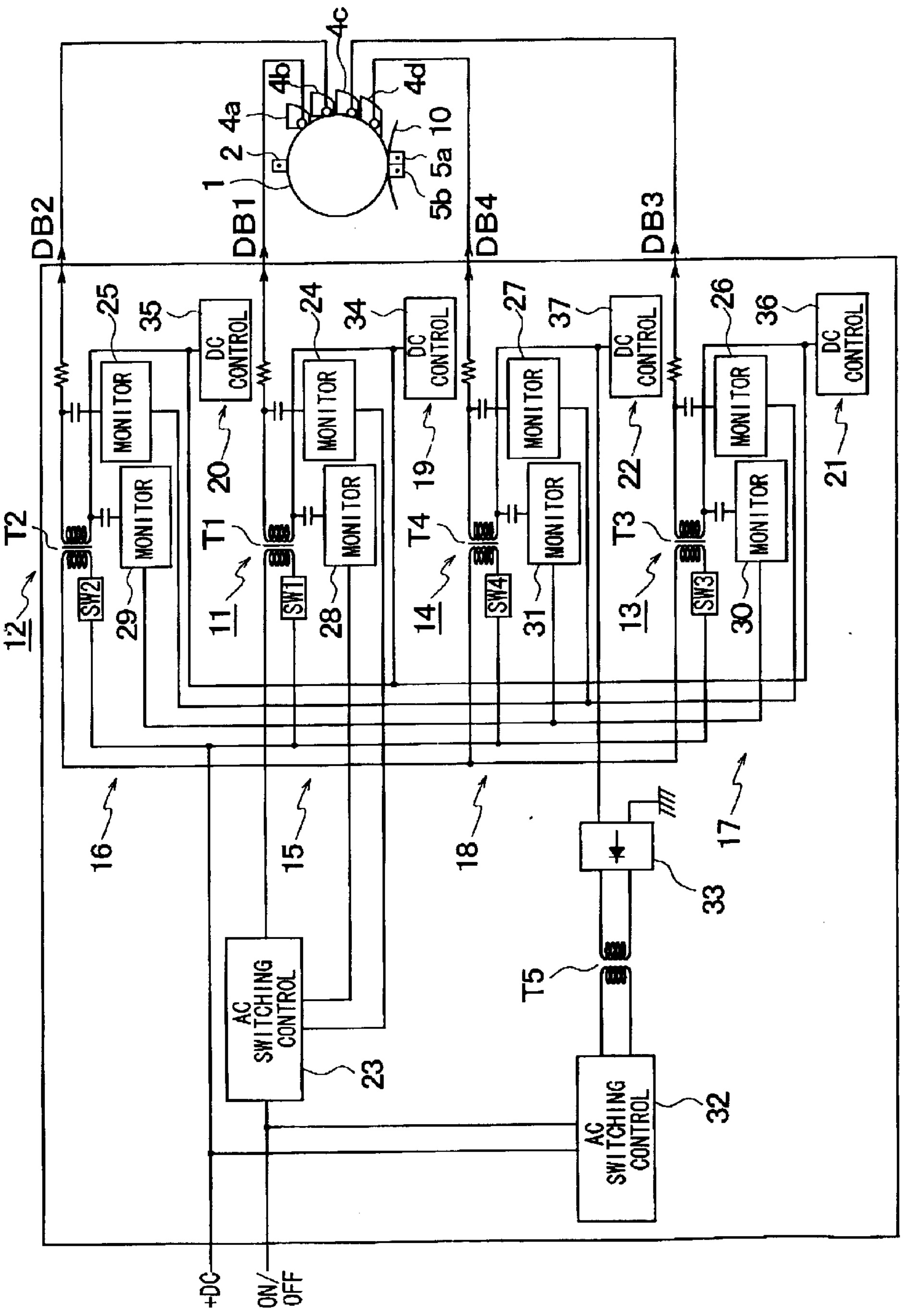
FIG. 16 is a block diagram of another conventional power supply apparatus that drives the developing unit of the electrophotographic image forming apparatus.
Figure 17:
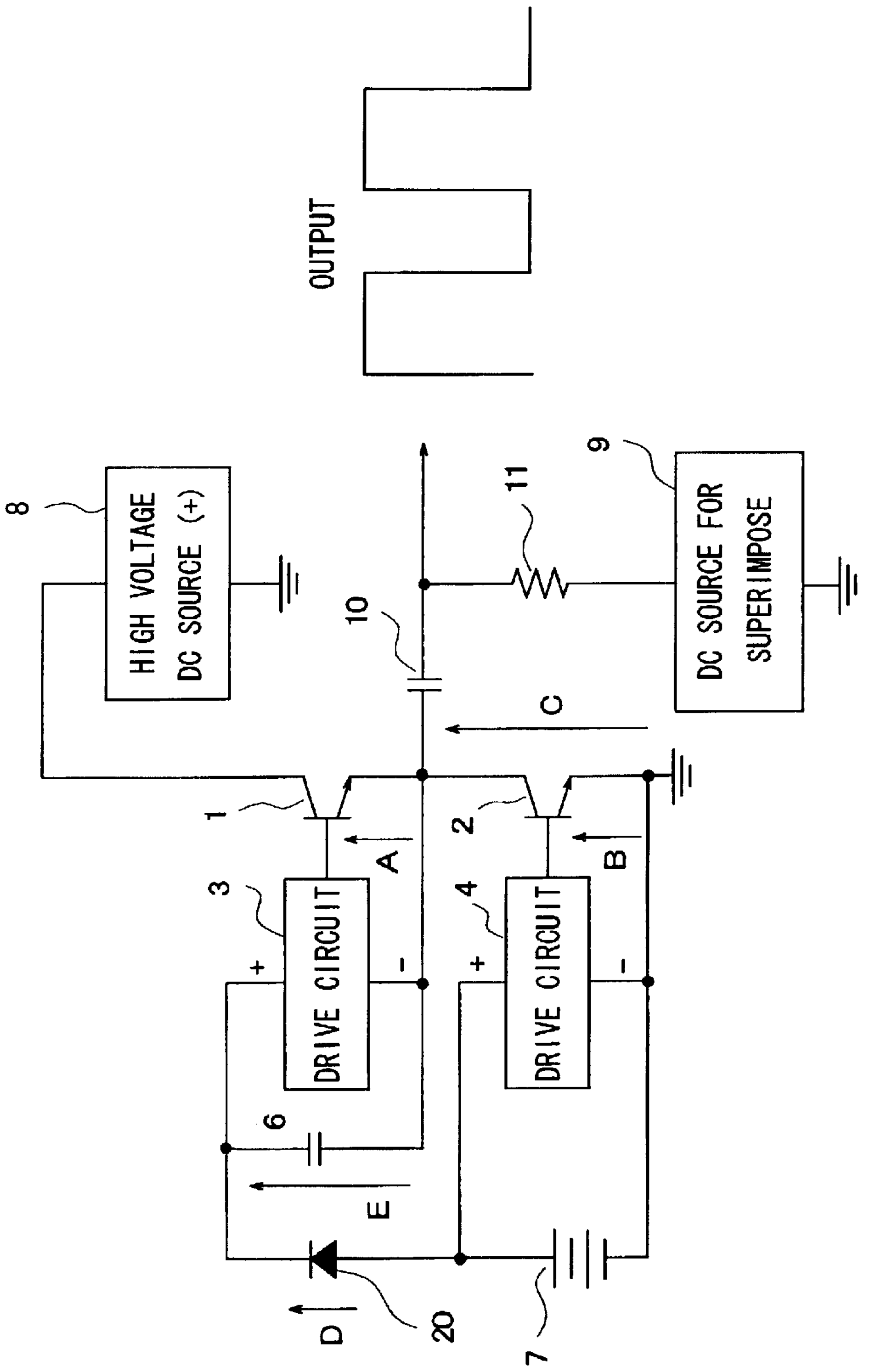
FIG. 17 illustrates a conventional circuit capable of generating a high-voltage rectangular wave signal by switching.
Figure 18:
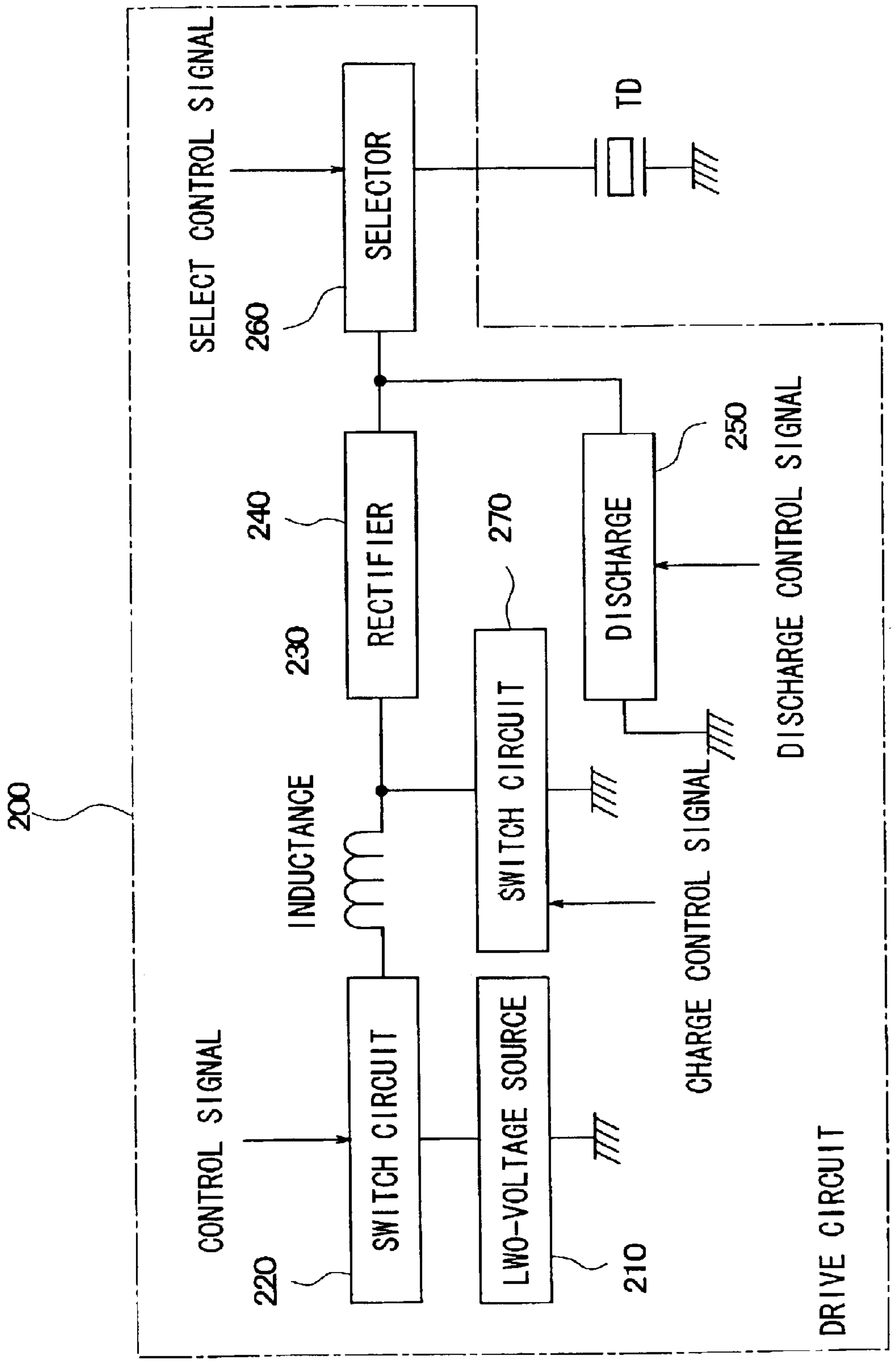
FIG. 18 is a block diagram of a power supply apparatus that acts as an inkjet drive circuit that employs a series resonance circuit including an inductor and a flyback voltage hold circuit.

A second embodiment of the present invention is a power supply apparatus for the electrophotographic image forming apparatus, which has the photoconductor drum and developers as shown in FIG. 15.

Figure 5:
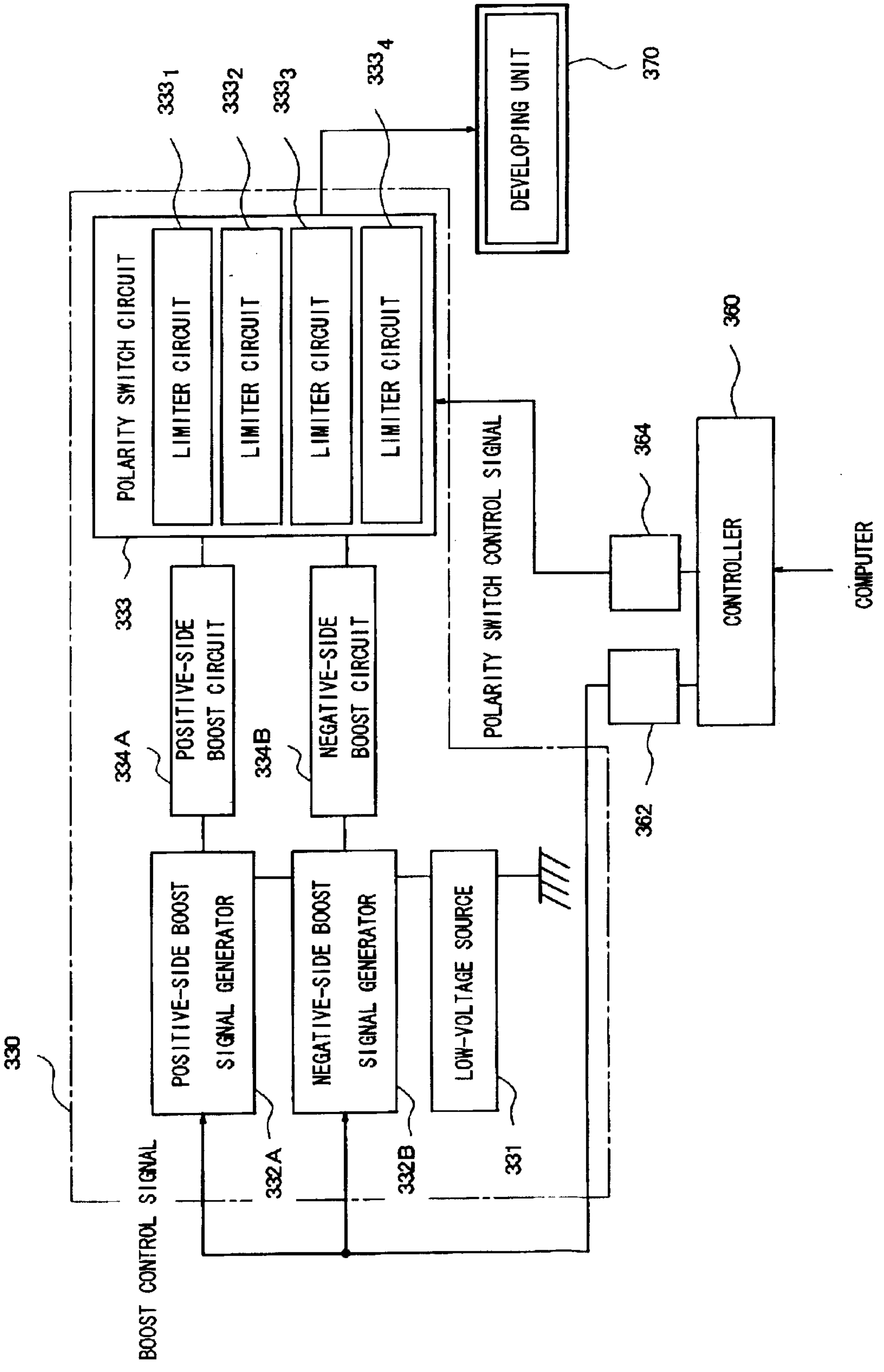
FIG. 5 is a block diagram of a power supply apparatus according to a second embodiment of the present invention.

FIG. 5 shows a power supply apparatus 330 configured by the second embodiment of the invention. The power supply apparatus 330 is made up of a low-voltage power source 331, a positive-side boost signal generator circuit 332A, a negative-side boost signal generator circuit 332B, a polarity switching circuit 333, a positive-side boost circuit 334A and a negative-side boost circuit 334B. The boost signal generator circuits 332A and 332B are supplied with a boost control signal for supplying a developing unit 370 with an AC signal with a DC bias being superimposed thereon. The circuits 332A and 332B utilize parallel and series resonance circuits in order to generate the boost signal having a large amplitude. The boost circuits 334A and 334B differ from the general Cockcroft-Walton circuit and does not employ any transformer unlike the general circuit. The signals multiplied by the boost circuits 334A and 334B are cumulated in capacitive loads connected via the polarity switching circuit 333. The polarity switching circuit 333 has four limiter circuits $\mathbf{333}_1$–$\mathbf{333}_4$, which control the positive and negative output voltages with several control patterns. The number of limiter circuits depends on the number of desired positive and negative voltage values.

The power supply apparatus 330 needs the above-mentioned control signals, and is therefore connected to a controller 360 that controls the image forming apparatus on the basis of image data transferred from an information processing apparatus such as a computer. More specifically, the controller 360 is connected to the boost signal generator circuits 332A and 332B via a boost control signal generator 362, and is connected to the polarity switching circuit 333 via a polarity switch control signal generator 364. The generators 362 and 364 may be formed by amplifiers that match the control signals from the controller 360 with the associated circuits. If the controller 360 is directly connected to the power supply apparatus acting as the drive circuit 330, the generators 362 and 364 may be omitted.

Figure 6:
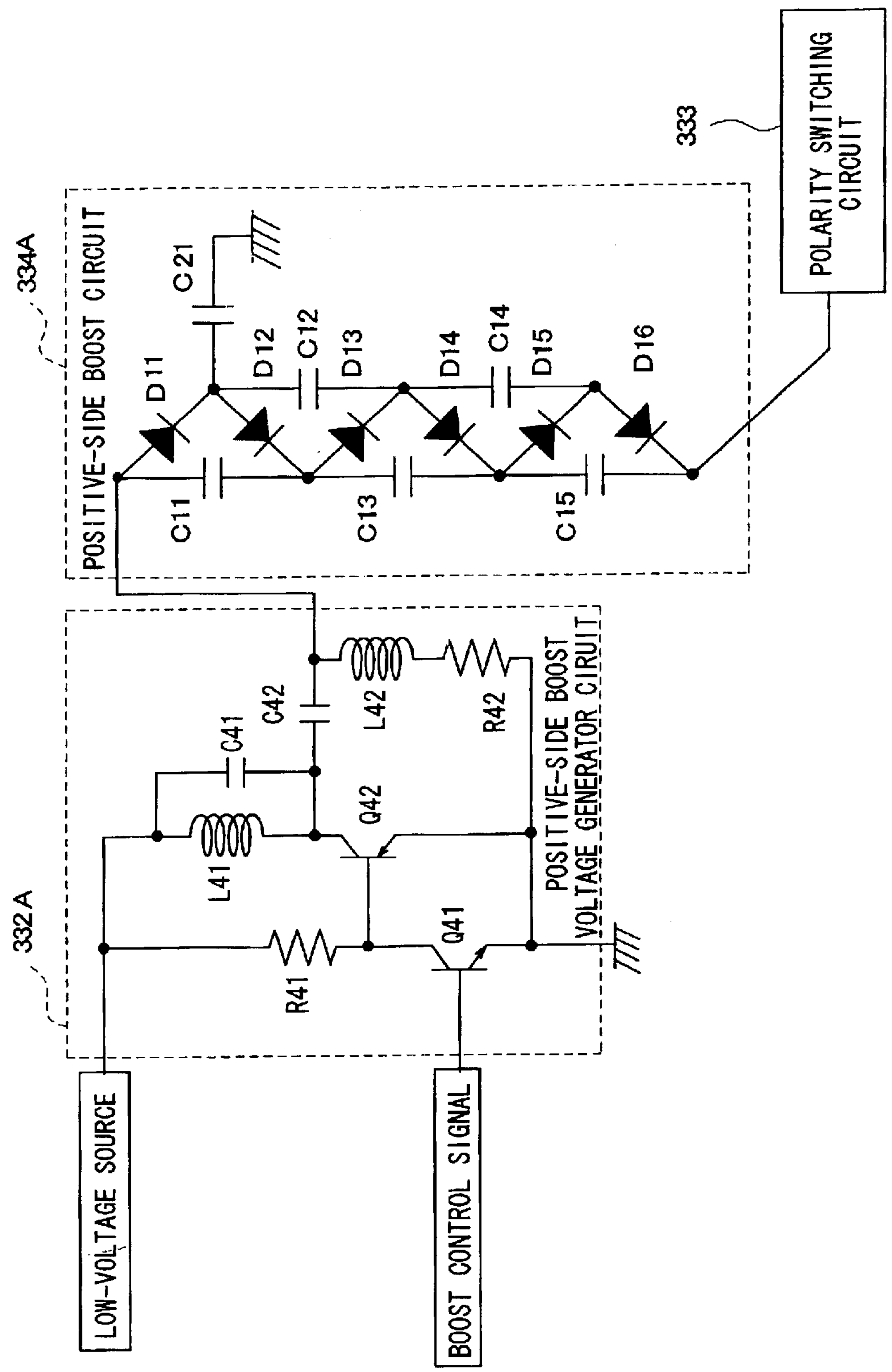
FIG. 6 is a circuit diagram of a positive-side boost signal generator circuit and a positive-side boost circuit used in the second embodiment of the present invention.

FIG. 6 shows a configuration of the positive-side boost signal generator circuit 332A and the positive-side boost circuit 334A. Although a power supply filter is omitted, it is preferably provided as necessary. The positive-side boost signal generator circuit 332A is made up of an npn transistor Q41, a pnp transistor Q42, resistors R41 and R42, inductors L41 and L42, and capacitors C41 and C42. The inductor L41 and the capacitor C41 are connected in parallel between the collector of the transistor Q42 and the low-voltage power source. The capacitor C42 is connected between the collector of the transistor Q42 and the boost circuit 334A. The inductor L42 and the resistor R42 are connected in series between the end of the capacitor C42 at the side of the boost circuit 334A and the ground. The resistor R41 is connected to the low-voltage power source and the collector of the transistor Q41. When the low-voltage power source is of a 24 V type, the boost control signal of 5 V applied to the base of the transistor Q41 is inversely amplified to about 5–24 V. The transistor Q42, the inductor L41 and the capacitor C41 form a parallel resonance circuit, which inversely amplifies the output signal of the transistor Q41 to thereby generate a signal that swings between 0–48 V about a center voltage of 24 V. The capacitor C42, the inductor L42 and the resistor R42 form a series resonance circuit, which generates a Q-times output that has a large amplitude swinging between −200 V and +200 V. This output is then applied to the positive-side boost circuit 334A. Instead of doubling the voltage developing across the secondary winding of the transformer, the present embodiment of the invention doubles the charge stored in the capacitor C21 connected between the diode D11 of the first stage and the ground. The positive-side boost circuit 334A utilizes only +200 V out of the input voltages of ±200 V as seen from the orientations of the diodes. The boost circuit 334A is capable of supplying the polarity switching circuit 333 with a voltage of 1.2 kV equal to a maximum of six times the input voltage.

The transistors Q41 may be replaced by an n-channel field effect transistor, and the transistors Q42 may be replaced by a p-channel field effect transistor. Preferably, these field effect transistors are of a type that does not have a parasitic capacitance between the source and drain.

The negative-side boost signal generator circuit 332B has the same configuration as the positive-side boost signal generator circuit 332A. The two generator circuits 332A and 332B are separately provided because the boost circuits 334A and 334B are supplied with the voltages as high as ±200 V and only limited elements switchable at high speeds can be used for generating the boost signals. If the boost signals applied to the boost circuits 334A and 334B are switchable at high speeds by means of appropriate elements, the generator circuits 332A and 332B may be unified so that the single boost signal generator circuit can be shared in the positive and negative directions.

The negative-side boost circuit 334B has the configuration obtained by reversing the orientations of all the diodes of the positive-side boost circuit 334A. That is, 2n rectifying elements are reversely connected in series ($1 \leqq n$) from a first terminal to a second terminal. Charge storage elements are provided so as to connect the first end of the (2i+1)th rectifying element and the second end of the (2i+2)th rectifying element ($0 \leqq i \leqq n-1$) and to connect the second end of the (2i+1)th rectifying element and the second end of the (2i+3)th rectifying element ($0 \leqq i \leqq n-2$). The second end of the first and (2n−1)th rectifying element is grounded via the respective capacitors. The negative-side boost circuit 334B doubles only −200 V out of the input voltages of +200 V, and supplies the resultant voltage to the polarity switching circuit 333.

Figure 7:
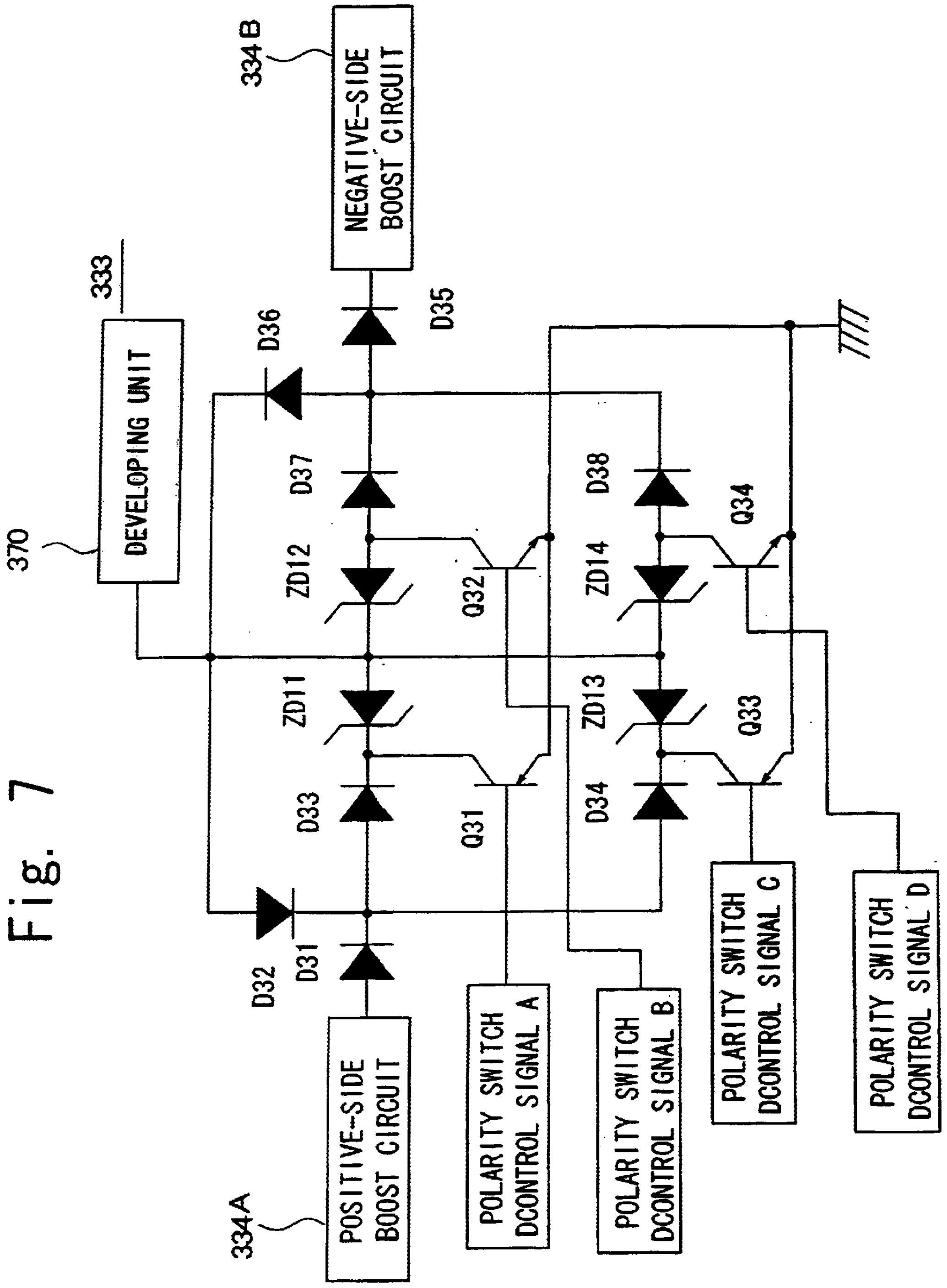
FIG. 7 is a circuit diagram of a polarity switching circuit used in the second embodiment of the present invention.

FIG. 7 shows a configuration of the polarity switching circuit 333, which selects one of the positive-side boost circuit 334A and the negative-side boost circuit 334B in accordance with the polarity switch control signal. Further, the limiter circuits $333_1$–$333_4$ that are configured as will be described later limit the output of the polarity switching circuit 333. The limited voltages defined by the limiter circuits $333_1$–$333_4$ are defined by the desired waveform of the output voltage. The developing unit 370 is supplied with, for example, an AC voltage of 1.2 $kV_{p-p}$ with a DC of −500 V being superimposed thereon. The following description is given on the assumption that the rated voltage to be applied to the developing unit 370 has an upper limit of +100 V with the AC signal being superimposed thereon, a DC voltage of −500 V, a lower limit of −1100 V with the AC signal being superimposed thereon, and a voltage of 0 V at the time of non-developing. The boosted signals from the boost circuits 334A and 334B are held by the diodes D31 and D35 for use in sample and hold. In order to prevent signals of the reverse polarities from being fed back to the boost circuits 334A and 334B, diodes D32 and D36 that block adverse currents are provided. That is, the diodes D32 and D36 prevent currents from flowing from the developing unit 370 towards the boost circuits 334A and 334B in the reverse directions.

The limiter circuits $333_1$–$333_4$ are configured as follows. A diode D33, a Zener diode ZD11 and a transistor Q31 form one limiter circuit (for example, $333_1$). Similarly, a diode D37, a Zener diode ZD12, and a transistor Q32 form a second limiter circuit (for example, $333_2$), and a diode D34, a Zener diode ZD13, and a transistor Q33 form a third limiter circuit (for example, $333_3$). Further, a diode D38, a Zener diode ZD14, and a transistor Q34 form a fourth limiter circuit (for example, $333_4$). The individual Zener diodes have the respective reverse voltages that are different from one another. For example, the Zener diodes ZD11, ZD12, ZD13 and ZD14 have reverse voltages of 1100 V, 100 V, 500 V and 0 V (equivalent to a regular diode), respectively. As shown in FIG. 7, four separate polarity switch control signals A–D, which are applied to the transistors of the respective limiter circuits $333_1$–$333_4$, define the limited voltages at one point and control the polarity of the output voltage.

Figure 8:
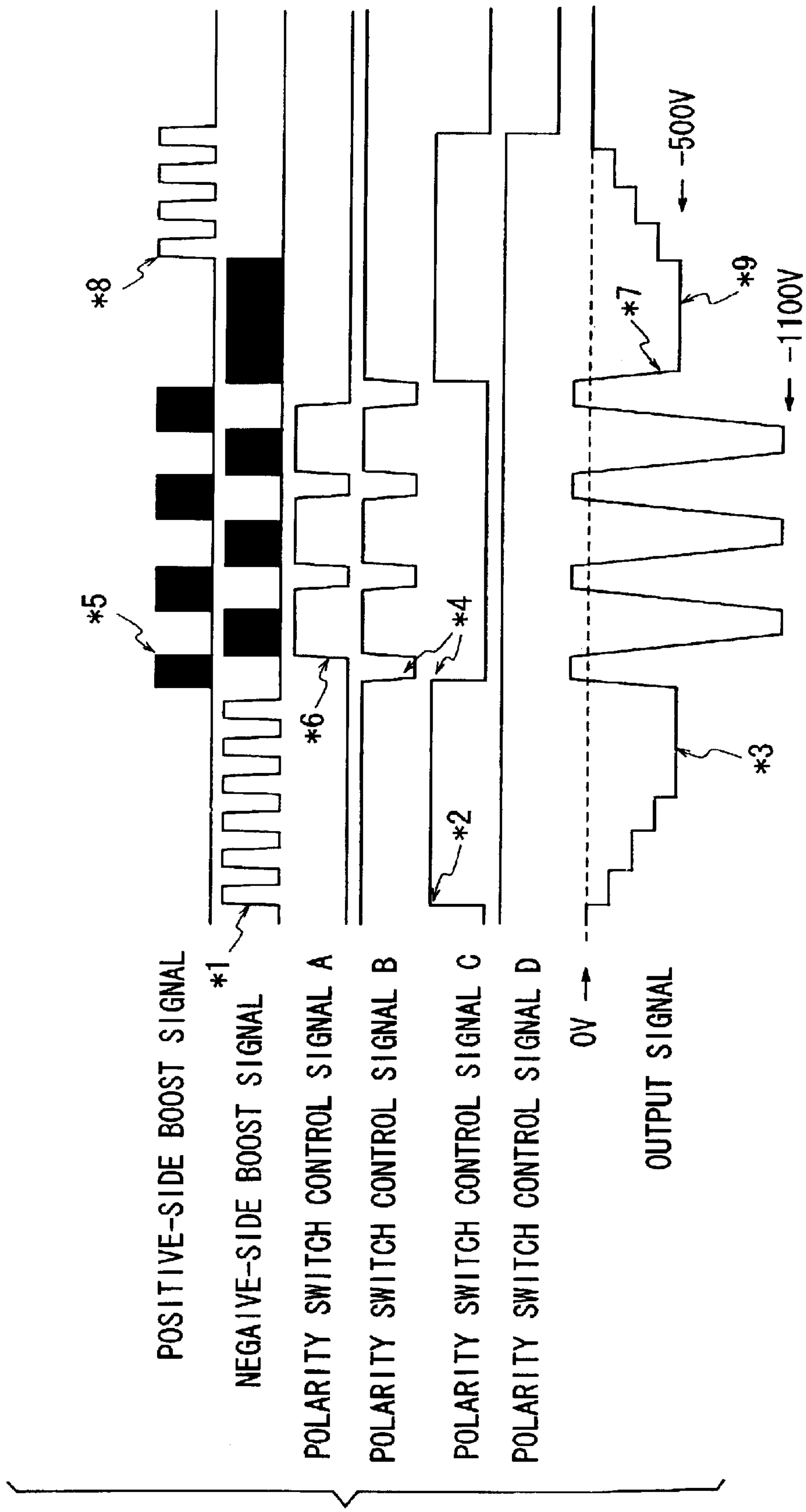
FIG. 8 is a timing chart of an operation of the power supply apparatus according to the second embodiment of the present invention.

FIG. 8 is a timing circuit of the operation of the circuit shown in FIG. 7, and illustrates a switching sequence of the polarity switching circuit 333. The switching sequence of generating the output signal shown in FIG. 8 is now described. The output waveform changes from 0 V to a DC voltage of −500 V. Next, an AC voltage of 1.2 $kV_{p-p}$ is superimposed on the −500 V DC voltage. Then, the output waveform returns to 0 V.

When a DC voltage of −500 V rising from 0 V in the negative direction is generated, the negative-side boosting is performed. The negative-side boost control signal is a pulse of about 12 kHz and is applied to the negative-side boost signal generator circuit 332B (*1 in FIG. 8). The frequency of the pulse controls the slope of boosting. A desired slope of the boosting can be defined by adjusting the frequency of the pulse. While the pulse of the negative-side boost control signal is being applied, only the polarity switch control signal C is ON (*2). The switch control signal C turns on the transistor Q33 of the associated limiter circuit, so that the Zener diode ZD13 is enabled. The remaining Zener diodes do not operate. The negative input from the negative-side boost circuit 334B is connected to the output lien to which the developing unit 370 is connected via the line composed of the diodes D35, D37 and the Zener diode ZD12 that is not operating, and the line composed of the diodes D35, D38 and the Zener diode ZD14 that is not operating. Only the Zener diode ZD13 having the 500 V reverse voltage is operating and is connected via the anode thereof to the output line to which the developing unit 370 is connected, the cathode thereof being grounded via the transistor Q33. Thus, the Zener diode ZD13 cuts off voltages lower than −500 V. During the period that the output voltage is maintained at −500 V, the negative-side boost control signal continues to supply consecutive pulses, and the Zener diode ZD13 continues to limit the output voltage. Thus, the DC voltage of −500 V can be secured (*3).

When the 1.2 $kV_{p\text{-}p}$ AC voltage of 5 kHz is superimposed on the DC voltage, a pulse signal of 2 MHz is assigned to the positive-side boost control signal. This is because more quick boosting is needed to generate the 6 kHz AC waveform. When the positive boosting is applied to −500 V, the polarity of the output voltage is reversed to the positive side when crossing 0 V. At that time, the polarity switch control signal C is turned off, and the polarity switch control signal B is turned on (*4 in FIG. 8). This is due to the event that the output voltage is −0 V when the Zener diode of the reverse polarity is enabled. It is therefore desirable that switching is carried out at a timing at which the output waveform is not disturbed. The polarity switch control signal B turns on the transistor Q32 connected to the Zener diode D12 having the limited value equal to 100 V. The positive-side boost control signal continues to consecutively supply pulses as long as flat portions of the AC waveform of 6 kHz in the positive direction are formed. The Zener diode ZD12 continues to limit the voltage at 100 V.

Thereafter, the positive-side boost control signal is turned off, and the negative-side boost control signal is applied (*5). The negative-side boost control signal provides a pulse signal of 2 MHz as in the case of the operation in the positive direction. When the voltage is boosted in the negative direction and crosses 0 V, the polarity switch control signal B is turned off, and the polarity switch control signal A is turned on (*6). The reason for the above switching is the same as has been described previously. The polarity switch control signal A turns on the transistor Q31 connected to the Zener diode ZD11 having the limited valued of −1100 V. The negative-side boosting is performed until the voltage reaches the limited voltage of the Zener diode ZD11 as in the case of the operation in the positive direction. Then, the output voltage is retained at the limited voltage.

The above-mentioned operation is repeatedly carried out while the positive-side and negative-side boost control signals are alternately turned on. When development is completed, the output voltage is returned too V. At that time, the output voltage is once maintained at a DC voltage of −500 V (*7). This is carried out by boosting the voltage from 100 V in the negative direction by assigning the pulse signal of 2 MHz to the negative-side boost control signal. When the output voltage reaches 0 V, the polarity switch control signal B is turned of and the polarity switch control signal C is turned on. Thus, the output voltage can be retained at −500 V. Then, a pulse signal of 12 kHz is applied to the positive-side boost signal (*8), so that the output voltage can be positively boosted from −500 V. The polarity switch control signal C is turned off and the polarity switch control signal is turned on just before the output voltage reaches 0 V. The polarity switch control signal D turns on the transistor Q34 connected to the Zener diode ZD14 having the limited value of 0 V (equivalent to a regular diode), so that the output voltage can be limited at 0 V.

As described above, by controlling the control signals A through D from the outside of the power supply apparatus 330 according to the switching sequence as shown in FIG. 8, it is possible to fix the output line connected to the developing unit 370 to desired positive and negative voltages and to superimpose the AC voltages on the fixed DC voltage. It is therefore possible to generate the DC-biased AC voltage without adding the AC voltage to the DC voltage by means of the adder. It is to be also noted that the boosted voltages can be limited at levels by supplying the Zener diodes with voltages that exceed the respective breakdown voltages without any complex circuits. That is, the power supply apparatus 330 can be achieved by a simple configuration.

The power supply apparatus 330 according to the second embodiment of the present invention may be applied to not only the developing unit of the electrophotographic apparatus but also the charger and the drive circuit for driving the piezoelectric elements. Particularly, the second embodiment of the invention provides the power supply apparatus capable of generating very high voltages.

(Third Embodiment)

A third embodiment of the present invention is an application to an electrostatic bias circuit suitable for, for example, a charger employed in the electrophotographic image forming apparatus.

Figure 9:
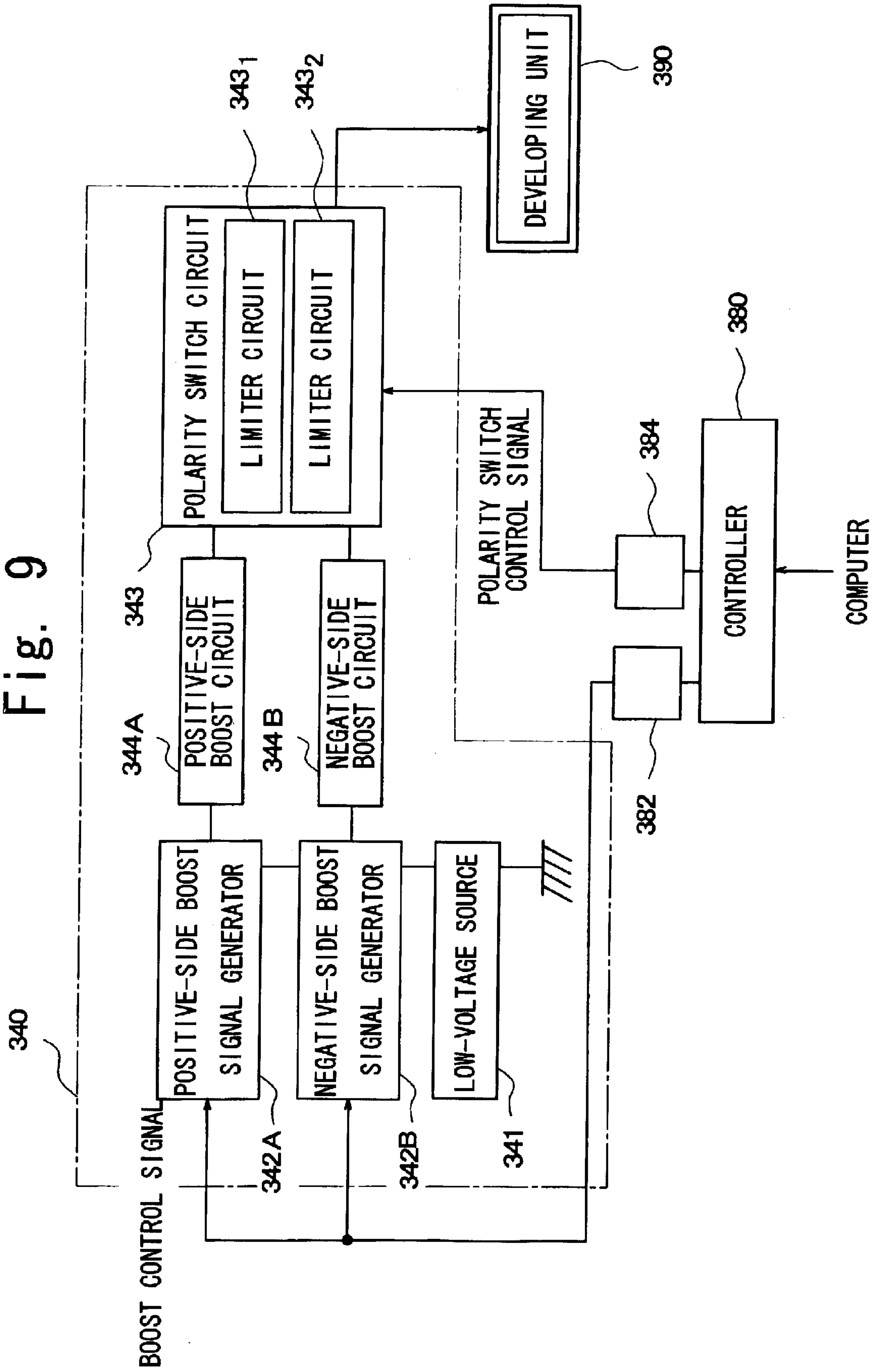
FIG. 9 is a block diagram of a power supply apparatus acting as a drive circuit according to a third embodiment of the present invention.

FIG. 9 shows an outline of the structure of a power supply apparatus 340 according to the third embodiment of the present invention. The power supply apparatus 340 is made up of a low-voltage power source 341, a positive-side boost signal generator circuit 342A, a negative-side boost signal generator circuit 342B, a polarity switching circuit 343, a positive-side boost circuit 344A and a negative-side boost circuit 344B. The boost signal generator circuits 342A and 342B are supplied with a boost control signal for supplying a DC bias voltage to a charger 390. The circuits 342A and 342B utilize the parallel and series resonance circuits for generating a boosted signal having a large amplitude. The boost circuits 344A and 344B have a configuration based on the Cockcroft-Walton circuit and does not use any transformer. The signals multiplied by the boost circuits 344A and 344B are cumulated in a capacitive load connected via the polarity switching circuit 343. The polarity switching circuit 343 includes two limiter circuits $\mathbf{343}_1$ and $\mathbf{343}_2$, which limit the positive and negative output voltages at given levels.

The power supply apparatus 340 needs the above-mentioned control signals, and is therefore connected to a controller 380 that controls the image forming apparatus on the basis of image data transferred from an information processing apparatus such as a computer. More specifically, the controller 380 is connected to the boost signal generator circuits 342A and 342B via a boost control signal generator 382, and is connected to the polarity switching circuit 343 via a polarity switch control signal generator 384. The generators 382 and 384 may be formed by amplifies that match the control signals from the controller 380 with the associated circuits. If the controller 380 is directly connected to the power supply circuit or drive apparatus 340, the generators 382 and 384 may be omitted.

Figure 10:
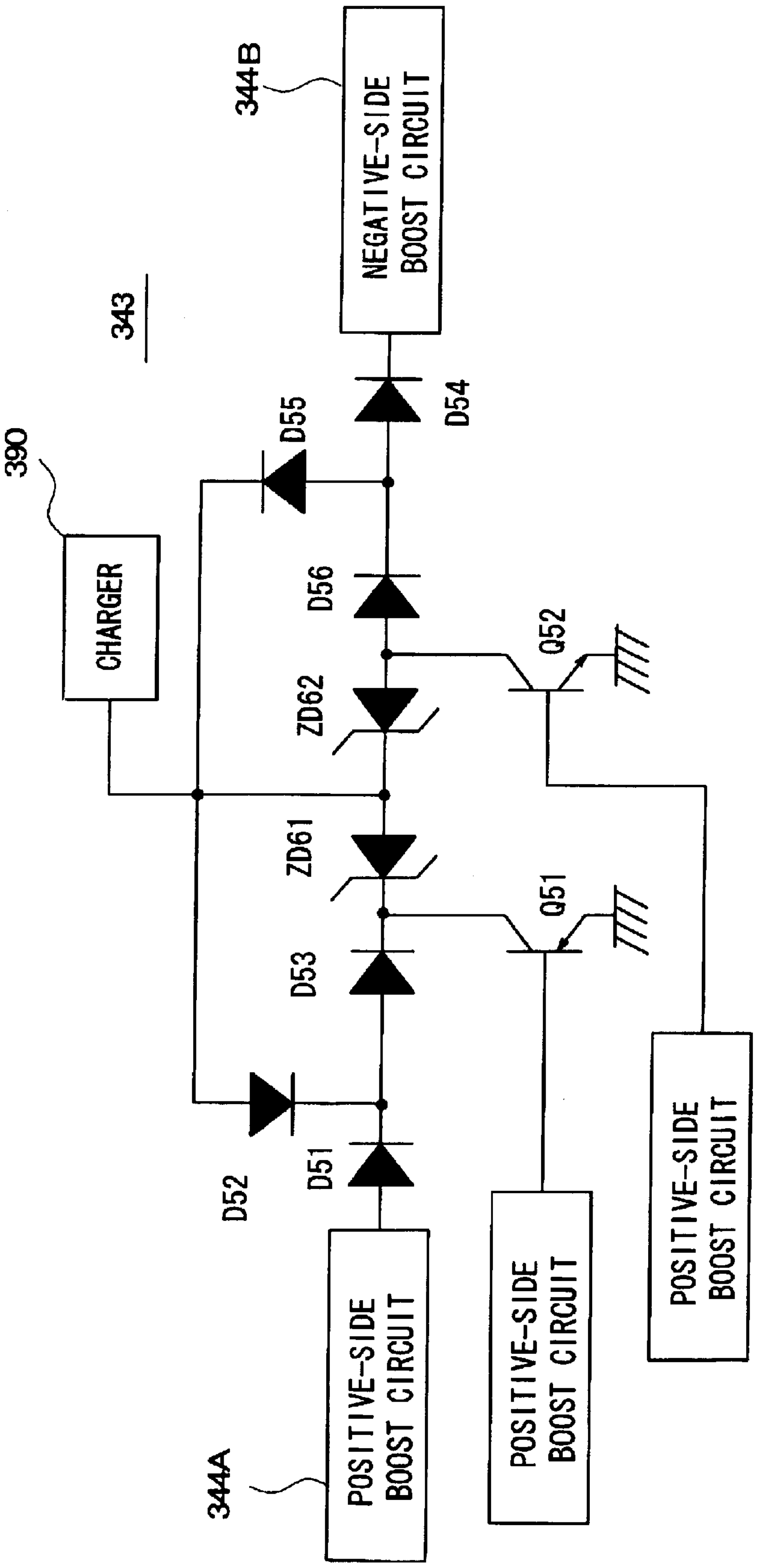
FIG. 10 is a circuit diagram of a polarity switch circuit used in the third embodiment of the present invention.

FIG. 10 shows a configuration of the polarity switch circuit 343, which selects one of the positive-side boost circuit 344A and the negative-side boost circuit 344B in accordance with the polarity switch control signal. The limiter circuits $\mathbf{343}_1$ and $\mathbf{343}_2$ in the positive and negative directions limit the boosted voltages. The charger 390 is alternately supplied with DC voltages of +500 V and −1 kV. In this case, a Zener diode ZD61 has a reverse voltage of 1000 V, and a Zener diode ZD62 has a reverse voltage of 500 V. For the sake of simplicity, the reverse voltage of 1000 V is provided by the single Zener diode ZD61, and the reverse voltage of 500 V is provided by the single Zener diode ZD62. However, these reverse voltages may be provided by a plurality of Zener diodes. The use of series-connected Zener diodes is less affected by noise. It is to be noted that the peak values of the AC signal can be arbitrarily determined by the limiter circuits. The circuit configuration shown in FIG. 10 can be obtained by modifying the configuration shown in FIG. 7 so that the limiter circuits respectively having the Zener diodes ZD13 and ZD14 are removed therefrom.

Figure 11:
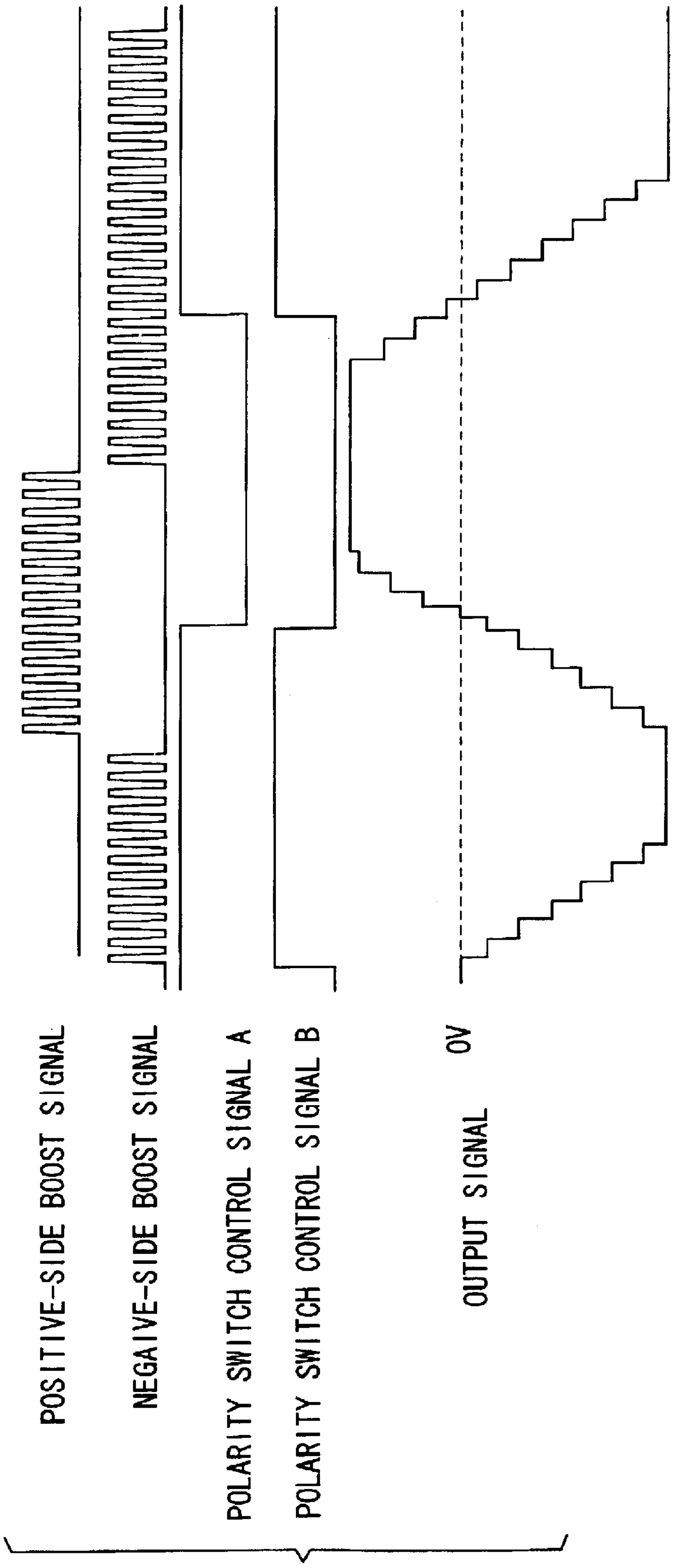
FIG. 11 is a waveform diagram of an operation of the power supply apparatus according to the third embodiment of the present invention.

FIG. 11 is a timing chart of the circuit shown in FIG. 10. A switching sequence of generating the output signal shown in FIG. 11 changes the output signal as follows. The output waveform changes from 0 V to a DC voltage of −1 kV. Next, the output waveform changes from −1 kV to 500 V. Then, the output waveform changes from 500 V to −1 kV. That is, the DC voltages of −1 kV and 500 V are alternately generated. When the output voltage is changed from 0 V to −1 kV, the negative-side boost control signal assigns a pulse signal of about 6 kHz to the negative-side boost signal generator circuit 344B. The number of pulses used at that time defines the slope of the transient edge of the output waveform. The boost signal generator circuits 324A and 324B inversely amplify the input pulses as in the case of the second embodiment of the invention, and generate the boosted signals having large amplitudes due to the series and parallel resonances. The boosted voltages are applied to the boost circuits 344A and 344B. The positive-side boost signal generator circuit 342A and the positive-side boost circuit 344A have the same configurations as the positive-side circuits shown in FIG. 6. The negative-side boost signal generator circuit 342B is configured as the positive-side boost signal generator circuit 342A. The negative-side boost circuit 344B has a circuit configuration obtained by reversing the diodes of the positive-side boost circuit 342A.

The voltage boosted by the negative-side boost circuit 344B is applied to the polarity switch circuit 343 shown in FIG. 10. At this time, the polarity switch control signal A is off, whereas the polarity switch control signal B is on. Thus, the transistor Q51 is on, and the cathode of the Zener diode ZD61 is grounded. The input voltage from the negative-side boost circuit 334B reaches an output line to which the charger 390 is connected via a diode D54, a diode D56, and the Zener diode ZD62 that is not operating. The Zener diode ZD61 has a reverse voltage of 1 kV. The cathode of the Zener diode ZD61 is grounded via the transistor Q51, so that voltages lower than −1 kV can be cut off. As long as the output voltage of −1 kV is being output, the negative-side boost control signal continues to consecutively supply pulses, and the limiter circuit in the negative direction of the polarity switch circuit 343 continues to operate. The charges that are removed from the boost circuit 344B by charging the charger 390 are made up by the continuously supplied pulses.

Then, the output voltage is changed from −1 kV to 500 V as follows. A pulse signal of about 6 kHz is assigned to the positive-side boost control signal as in the case of the negative-side boosting. The charges are cumulated from −1 kV to +500 V. When the output voltage reaches 0 V, the polarity switch control signals B and A are respectively turned off and on. Thus, the output voltage is once set at 0 V, and the charges are cumulated again. Since the polarity switch control signal A is on, the anode of the Zener diode ZD62 is grounded via the transistor Q52, so that the limiter circuit in the positive direction is enabled. The input from the positive-side boost circuit 344A is connected to the output line connected to the charger 390 via the diode D51 acting as a sample and hold element, the diode D53 and the Zener diode ZD61 that is not operating. The Zener diode ZD62 has the reverse voltage equal to 500 V and cuts off voltages higher than 500 V.

It will be noted that the scale of time denoted by the horizontal axis is changed so that the waveform of the output signal is emphasized visually. In fact, the transient sections are very short and the output signal is almost retained at the fixed positive or negative voltage.

Figure 12:
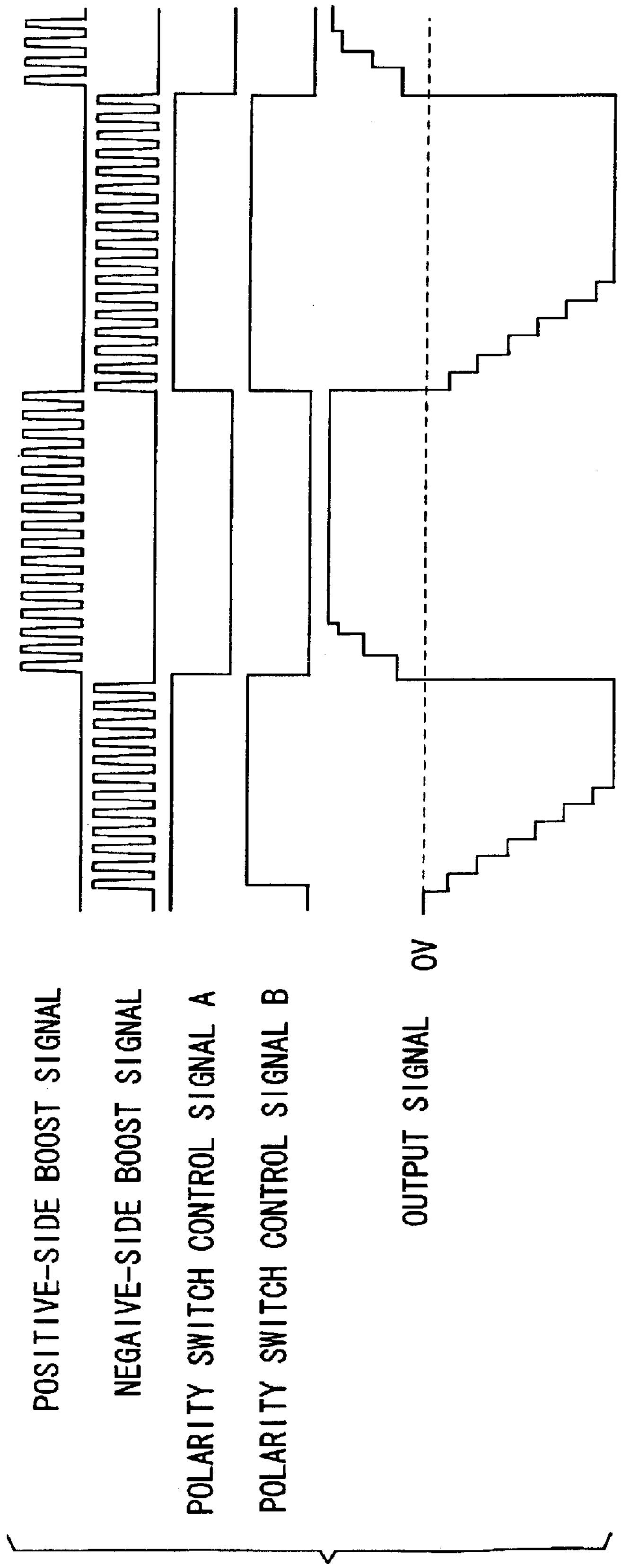
FIG. 12 is a waveform diagram of another operation of the power supply apparatus according to the third embodiment of the present invention.

FIG. 12 is a timing chart of another operation of the circuit shown in FIG. 10. In FIG. 10, the polarity switch control signals A and B are enabled and disabled or vice versa at an output voltage approximately equal to 0 V. In contrast, in the operation shown in FIG. 12, the polarity switch control signals A and B are enabled and disabled or vice versa at the timing when the boosting direction is reversed. Thus, the output signal is stepwise boosted towards the positive and negative maximum values, whereas the output signal is discharged towards 0 V due to the time constants of the load and circuit. It will be noted that the scale of time denoted by the horizontal axis of FIG. 12 is changed so that the waveform of the output signal, particularly, the stepwise change is emphasized visually. According to the third embodiment of the present invention, the enable signals and the polarity switch control signals are commonly used when the boost control signals are generated from a basic clock signal (not shown), so that the circuit involved in generation of the control signals can be simplified.

The third embodiment of the present invention may be applied to not only the charger of the electrophotographic apparatus but also the developing unit and the drive circuit for driving the piezoelectric elements. Particularly, the third embodiment of the invention provides the simplified power supply apparatus capable of generating very high voltages.

(Fourth Embodiment)

Figure 13:
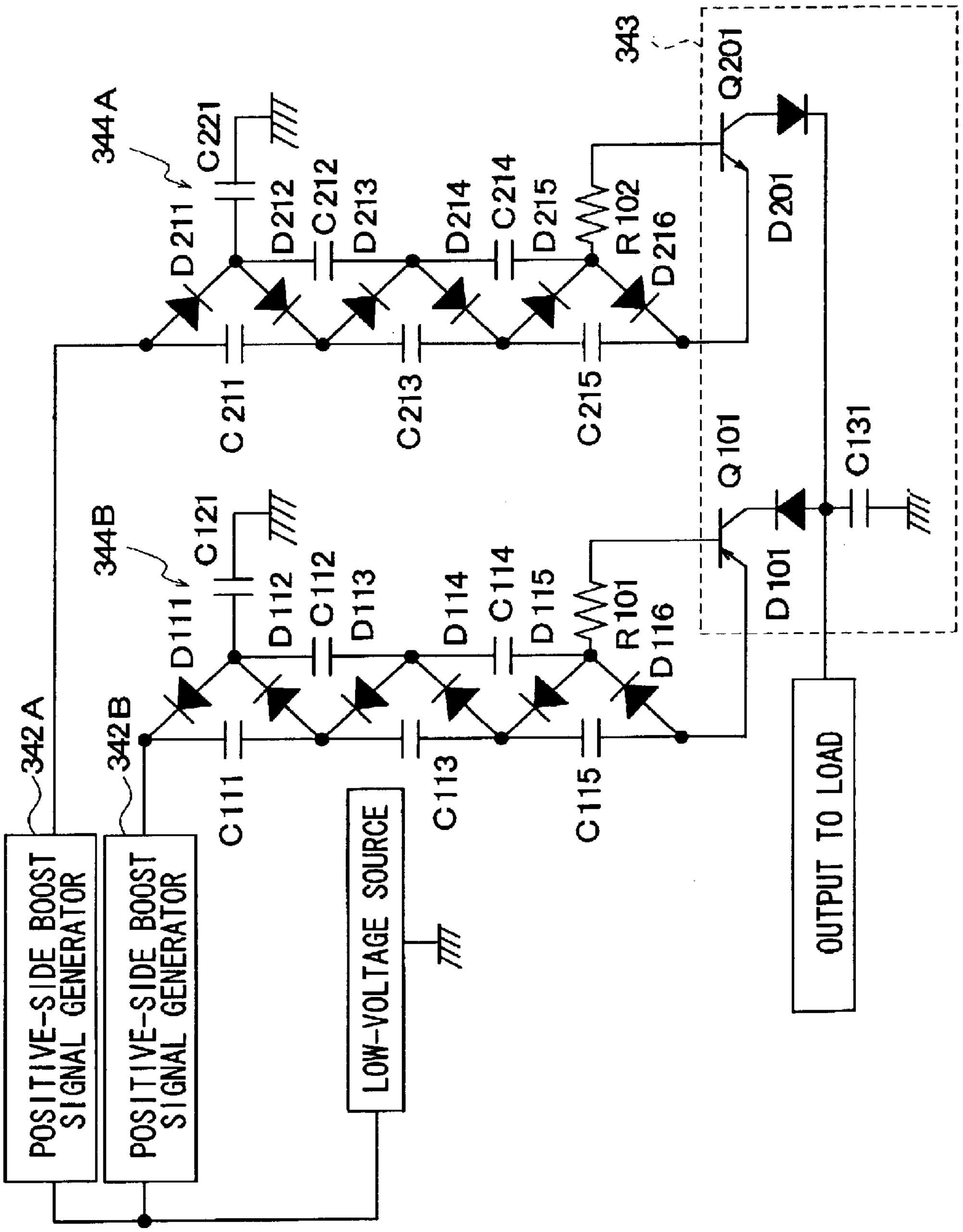
FIG. 13 is a circuit diagram of a power supply apparatus acting as a drive circuit according to a fourth embodiment of the present invention.
Figure 14:
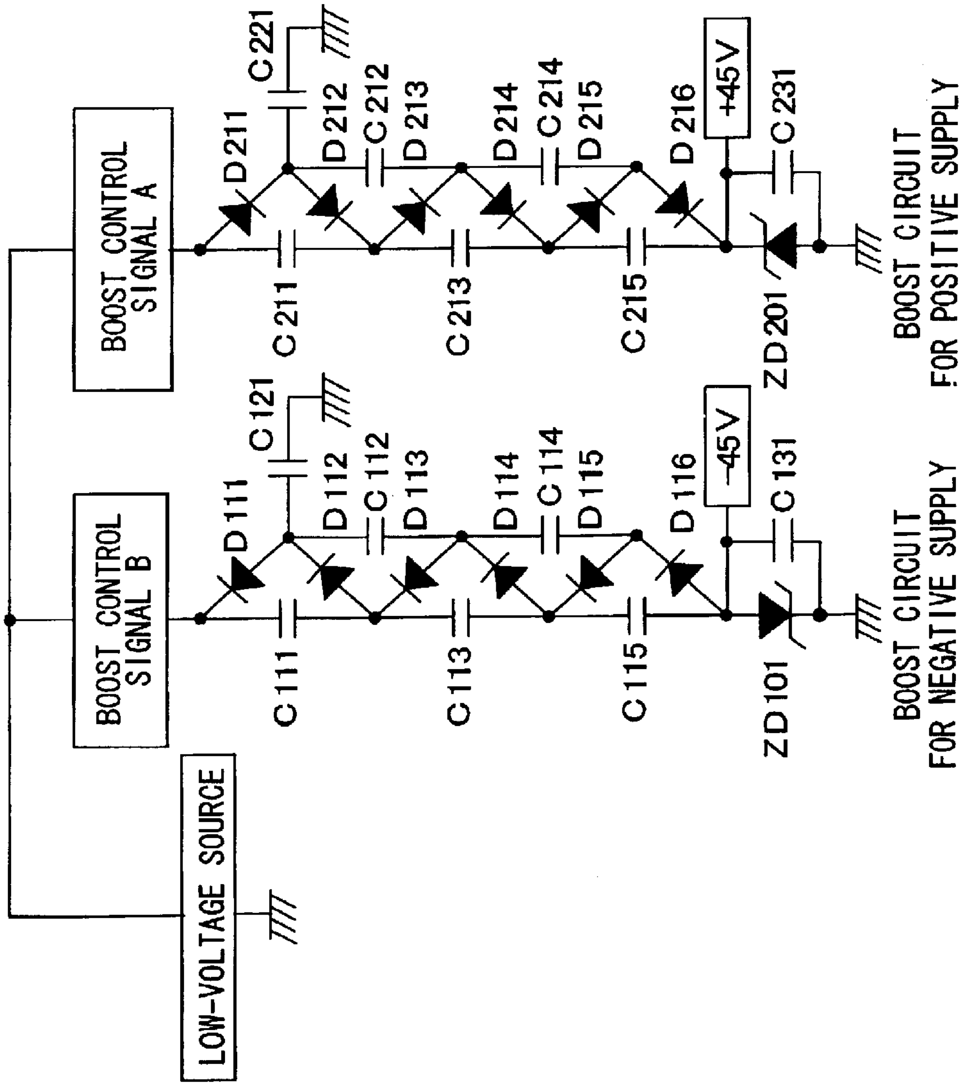
FIG. 14 is a circuit diagram of a voltage generator for generating enable signals used in the embodiments of the present invention.

FIG. 13 is a circuit diagram of a power supply apparatus according to a fourth embodiment of the present invention. The polarity switch circuit 343 shown in FIG. 14 is made up of an npn transistor Q101, a pnp transistor Q201, diodes D101 and D201, and a capacitor C131. This circuit configuration is simpler than that shown in FIG. 10, but has a comparatively lower breakdown voltage because it employs the pnp transistor Q201. The transistors Q101 and Q201 may be replaced with n-channel and p-channel field effect transistors, respectively. Preferably, these field effect transistors are of a type that does not have a parasitic capacitance between the source and drain.

The positive-side boost circuit 344A includes diodes D211–D216, capacitors C211–C215 and C221, and a resistor R102. Similarly, the positive-side boost circuit 344B includes diodes D111–D116, capacitors C111–C115 and C121, and a resistor R101.

The resistor R102 acts as a bias resistor, and is provided between the transistor Q201 and the node at which the diodes D215 and D216 of the final stage are connected. After the charge is cumulated in the capacitor C215, a bias current is supplied to the transistor Q201, which is thus turned on. Thus, the boosted voltage passes through the diode D201, and the capacitor C131 is charged and supplied to the load. Similarly, after the charge is cumulated in the capacitor C115 of the final stage, a bias current is supplied to the transistor Q101 via the bias resistor R101, so that the transistor Q101 can be turned on. Thus, current flows through the diode D101 and transistor Q101 from the capacitor C131, so that the capacitor C131 is charged and the negative output can be supplied to the load.

The fourth embodiment of the present invention may be applied to not only the charger of the electrophotographic apparatus but also the developing unit and the drive circuit for driving the piezoelectric elements. Particularly, the fourth embodiment of the invention provides the simplified power supply apparatus capable of generating very high voltages.

The present invention is not limited to the specifically disclosed embodiments, and variations and modifications may be made without departing from the scope of the present invention.

What is claimed is:

1. A power supply apparatus comprising:

a boost circuit that has rectifying elements and charge storage elements associated with the rectifying elements and outputs a boosted voltage by sequentially cumulating charges in the charge storage elements in accordance with an AC input signal; and a switch circuit that switches a polarity of boosting in cumulating the charges in the charge storage elements, the boost circuit including a circuit part that supplies charges to be sequentially cumulated in positive and negative directions in accordance with the AC input signal.

2. The power supply apparatus according to claim 1, wherein the circuit part comprises a charge storage part that initially stores the charges in accordance with the AC input signal.

3. The power supply apparatus according to claim 1, wherein the circuit part comprises two charge storage parts that store the charges in accordance with the AC input signal in order to supply the charge storage elements associated with the rectifying elements with the charges necessary for boosting in the positive and negative directions.

4. The power supply apparatus according to claim 1, wherein:

the rectifying elements and the charge storage elements form a ladder circuit including voltage doublers; and the circuit part comprises a first charge storage part provided between a first one of the voltage doublers located at a first stage of the ladder circuit in the positive direction and ground, and a second charge storage part provided between a second one of the voltage doublers located at a first stage of the ladder circuit in the negative direction and ground.

5. The power supply apparatus according to claim 1, wherein the switch circuit comprises a circuit that applies the AC input signal to one of first and second ends of the boost circuit and causes the boosted voltage to be output via the other one of the first and second ends of the boost circuit.

6. The power supply apparatus according to claim 1, wherein the switch circuit comprises a first switch circuit that selectively connects the AC input signal to one of first and second ends of the boost circuit, and a second switch circuit that connects the other one of the first and second ends to a load.

7. The power supply apparatus according to claim 1, further comprising an element that is provided between the boost circuit and a load and holds the boosted voltage.

8. A power supply apparatus comprising:

a boost circuit having unit circuits connected in a ladder formation, each of the unit circuits including two rectifying elements and one charge storage element; and a switch circuit interchanging connections of an AC input signal and a load to input and output terminals of the boost circuit, the boost circuit including a first charge storage circuit connected between ground and one of the unit circuits located at a first stage in a positive direction and a second charge storage circuit connected between the ground and another one of the unit circuits located at a first stage in a negative direction.

9. A power supply apparatus comprising:

a boost circuit having 2n rectifying elements connected forwardly from a first terminal to a second terminal ($1 \leqq n$), each of the 2n rectifying elements having first and second ends, and having charge storage elements provided so as to connect the first end of the (2i+1)th rectifying element and the second end of the (2i+2)th rectifying element ($0 \leqq i \leqq n-1$) and to connect the second end of the (2i+1)th rectifying element and the second end of the (2i+3)th rectifying element ($0 \leqq i \leqq n-2$), the second ends of the first and (2n−1)th rectifying elements being grounded via respective charge storage elements; and a switch circuit that interchanges connections of an AC input signal and a load to the first and second terminals of the boost circuit.

10. A power supply apparatus comprising:

a positive-side boost circuit including first rectifying elements, first charge storage elements, and a first circuit part that supplies charges to be sequentially cumulated in the first charge storage elements in accordance with an AC signal;

a negative-side boost circuit including second rectifying elements, second charge storage elements, and a second circuit part that supplies charges to be sequentially cumulated in the second charge storage elements in accordance with the AC signal; and a switch circuit that selectively supplies a load with one of outputs of the positive-side and negative-side boost circuits in accordance with a given sequence.

11. The power supply apparatus according to claim 10, wherein the first and second circuit parts include third charge storage elements that initially store the charges in accordance with the AC signals and have respective ends that are grounded.

12. The power supply apparatus according to claim 10, wherein the switch circuit comprises an adverse current blocking circuit that prevents currents from reversely flowing in the positive-side and negative-side boost circuits.

13. The power supply apparatus according to claim 10, wherein the switch circuit comprises a limiter circuit that limits output voltages of the positive-side and negative-side boost circuits at respective given levels.

14. The power supply apparatus according to claim 10, wherein the switch circuit comprises a first limiter circuit that limits an output voltage of the positive-side boost circuit at different levels, and a second limiter circuit that limits an output voltage of the negative-side boost circuit at different levels.

15. The power supply apparatus according to claim 10, wherein the switch circuit comprises limiter elements that limit output voltages of the positive-side and negative-side boost circuits at given levels, and switching elements that selectively enable the limiter elements in accordance with external control signals.

16. The power supply apparatus according to claim 10, wherein the switch circuit comprises limiter elements that limit output voltages of the positive-side and negative-side boost circuits at a given level, and a limiter circuit that superimposes an AC voltage on the given level.

17. The power supply apparatus according to claim 10, further comprising a boost signal generator circuit that supplies the AC input voltage to the positive-side and negative-side boost circuits.

18. The power supply apparatus according to claim 17, wherein the boost signal generator circuit comprises a resonance circuit having an inductor and a capacitor.

19. The power supply apparatus according to claim 17, wherein the boost signal generator circuit comprises at least one of a parallel resonance circuit and a series resonance circuit.

20. A power supply apparatus comprising:

a positive-side boost circuit having 2n rectifying elements connected forwardly from a first terminal to a second terminal ($1 \leqq n$), each of the 2n rectifying elements having first and second ends, and having charge storage elements provided so as to connect the first end of the (2i+1)th rectifying element and the second end of the (2i+2)th rectifying element ($0 \leqq i \leqq n-1$) and to connect the second end of the (2i+1)th rectifying element and the second end of the (2i+3)th rectifying element ($0 \leqq i \leqq n-2$), the second end of a first rectifying element in a positive direction being grounded via a first charge storage circuit;

a negative-side boost circuit having 2n rectifying elements connected reversely from the first terminal to the second terminal ($1 \leqq n$), each of the 2n rectifying elements of the negative-side boost circuit having third and fourth ends, and having charge storage elements provided so as to connect the third end of the (2i+1)th rectifying element and the fourth end of the (2i+2)th rectifying element ($0 \leqq i \leqq n-1$) and to connect the fourth end of the (2i+1)th rectifying element and the fourth end of the (2i+3)th rectifying element ($0 \leqq i \leqq n-2$), the fourth end of a first rectifying element in a negative direction being grounded via a second charge storage circuit; and a switch circuit that selectively supplies outputs of the positive-side and negative-side boost circuits to a load.

21. An image forming apparatus comprising:

an image forming part; and a power supply apparatus supplying drive power to the image forming part, the power supply apparatus comprising:

a boost circuit having rectifying elements and charge storage elements associated with the rectifying elements and outputting a boosted voltage by sequentially cumulating charges in the charge storage elements in accordance with an AC input signal; and a switch circuit switching a polarity of boosting in cumulating the charges in the charge storage elements, the boost circuit including a circuit part that supplies charges to be sequentially cumulated in positive and negative directions in accordance with the AC input signal.

* * * * *